(12) United States Patent
Kim

(10) Patent No.: US 11,580,063 B2
(45) Date of Patent: Feb. 14, 2023

(54) APPARATUS FOR SECURING STORAGE SPACE AND METHOD THEREOF

(71) Applicant: Samsung Electronics Co., Ltd., Suwon-si (KR)

(72) Inventor: Kyung-Hwa Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 342 days.

(21) Appl. No.: 15/984,838

(22) Filed: May 21, 2018

(65) Prior Publication Data

US 2018/0336208 A1 Nov. 22, 2018

(30) Foreign Application Priority Data

May 22, 2017 (KR) ........................ 10-2017-0062735

(51) Int. Cl.
| | |
|---|---|
| *G06F 16/17* | (2019.01) |
| *G06F 16/11* | (2019.01) |
| *G06F 3/04817* | (2022.01) |
| *G06F 3/0482* | (2013.01) |
| *G06F 3/06* | (2006.01) |

(Continued)

(52) U.S. Cl.
CPC .......... *G06F 16/116* (2019.01); *G06F 3/0482* (2013.01); *G06F 3/04817* (2013.01); *G06F 3/04847* (2013.01); *G06F 3/0608* (2013.01); *G06F 3/0643* (2013.01); *G06F 3/0661* (2013.01); *G06F 16/1724* (2019.01); *G06F 16/1727* (2019.01); *G06F 21/62* (2013.01)

(58) Field of Classification Search
None
See application file for complete search history.

(56) References Cited

U.S. PATENT DOCUMENTS

| | | | | |
|---|---|---|---|---|
| 4,468,755 A | * | 8/1984 | Iida ................... | G06K 17/0016 345/660 |
| 5,659,704 A | * | 8/1997 | Burkes ................ | G06F 11/1076 711/114 |

(Continued)

FOREIGN PATENT DOCUMENTS

| | | |
|---|---|---|
| JP | 2006-295509 A | 10/2006 |
| KR | 10-2001-0008975 A | 2/2001 |

(Continued)

OTHER PUBLICATIONS

Korean Office Action dated Oct. 28, 2021, issued in Korean Patent Application No. 10-2017-0062735.

*Primary Examiner* — Ashish Thomas
*Assistant Examiner* — Mellissa M. Ohba
(74) *Attorney, Agent, or Firm* — Jefferson IP Law, LLP

(57) ABSTRACT

The electronic device includes a display, a memory, and a processor operatively coupled to the display and the memory. The processor is configured to identify a residual level of a storage space of the memory, in response to the residual level of the storage space of the memory being less than a predefined threshold value, control the display to display a file converting scheme list including a plurality of file converting schemes, select one file converting scheme among the plurality of file converting schemes, based on a received input, and perform file converting, based on the selected file converting scheme.

12 Claims, 23 Drawing Sheets

(51) Int. Cl.
   *G06F 3/04847*       (2022.01)
   *G06F 21/62*         (2013.01)

(56) References Cited

U.S. PATENT DOCUMENTS

| | | | | |
|---|---|---|---|---|
| 6,798,980 | B1* | 9/2004 | Seo | H04N 5/76 |
| | | | | 386/232 |
| 9,177,177 | B1* | 11/2015 | Patil | G06F 21/78 |
| 9,830,111 | B1* | 11/2017 | Patiejunas | G06F 3/0625 |
| 9,894,132 | B2* | 2/2018 | Shin | H04L 67/02 |
| 2001/0050875 | A1* | 12/2001 | Kahn | H04N 1/2112 |
| | | | | 365/229 |
| 2003/0110169 | A1* | 6/2003 | Zuili | C12N 9/16 |
| 2003/0154381 | A1* | 8/2003 | Ouye | G06F 21/6209 |
| | | | | 713/182 |
| 2003/0235394 | A1* | 12/2003 | Boston | H04N 5/76 |
| | | | | 386/295 |
| 2004/0013245 | A1* | 1/2004 | Yokoyama | H04M 1/6505 |
| | | | | 379/88.1 |
| 2005/0132161 | A1* | 6/2005 | Makela | G06F 12/08 |
| | | | | 711/170 |
| 2006/0224943 | A1* | 10/2006 | Snyder | H04N 21/2541 |
| | | | | 715/209 |
| 2011/0047190 | A1* | 2/2011 | Lee | H04L 63/10 |
| | | | | 707/803 |
| 2012/0120268 | A1* | 5/2012 | Bockus | H04N 9/8233 |
| | | | | 348/220.1 |
| 2012/0136902 | A1* | 5/2012 | Oyarzabal | G06F 16/40 |
| | | | | 707/802 |
| 2014/0032833 | A1* | 1/2014 | Cudak | G06F 3/0608 |
| | | | | 711/112 |
| 2014/0068015 | A1* | 3/2014 | Shin | H04L 67/04 |
| | | | | 709/219 |
| 2016/0291876 | A1* | 10/2016 | Alatorre | G06F 3/0644 |
| 2017/0285975 | A1* | 10/2017 | Trika | G06F 3/0673 |

FOREIGN PATENT DOCUMENTS

| | | |
|---|---|---|
| KR | 10-2011-0047869 A | 5/2011 |
| KR | 10-2013-0068590 A | 6/2013 |
| KR | 10-2014-0028454 A | 3/2014 |

* cited by examiner

APPARATUS FOR SECURING STORAGE SPACE AND METHOD THEREOF

CROSS-REFERENCE TO RELATED APPLICATION(S)

This application is based on and claims priority under 35 U.S.C. § 119(a) of a Korean patent application number 10-2017-0062735, filed on May 22, 2017, in the Korean Intellectual Property Office, the disclosure of which is incorporated by reference herein in its entirety.

BACKGROUND

1. Field

The disclosure relates to an apparatus and method for securing a storage space in an electronic device.

2. Description of Related Art

An electronic device such as a personal computer, a notebook computer, a portable phone, etc. can provide various multimedia services. The multimedia service can include various contents such as a photo, a video, music, a game, broadcasting, etc. The electronic device can store the content by using an internal memory, an external memory, or a server (e.g., cloud).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device uses a restricted storage space like a memory or server. In case where the electronic device uses the restricted storage space, the electronic device needs a way for efficiently managing the storage space. The electronic device can delete part of previously stored contents in order to secure the storage space. An inconvenience can be caused in which the use of the deleted content can be limited, and the corresponding content cannot be again used by a user of the electronic device.

Additional aspects will be set forth in part in the description which follows and, in part, will be apparent from the description, or may be learned by practice of the presented embodiments. Various embodiments of the disclosure may provide an apparatus and method for efficiently securing a storage space in an electronic device.

In accordance with an aspect of the disclosure, an electronic device for securing a storage space is provided. The electronic device includes a display, a memory, and a processor operatively coupled to the display and the memory. The processor is configured to identify whether to apply a storage space securing function for the memory, control the display to display a file converting scheme list including a plurality of file converting schemes, select one file converting scheme among the plurality of file converting schemes, based on a received input, and perform file converting, based on the selected file converting scheme.

In accordance with an aspect of the disclosure, an operation method of an electronic device for securing a storage space is provided. The method includes identifying a storage space of a memory of the electronic device, identifying whether to apply a storage space securing function for the memory, displaying a file converting scheme list including a plurality of file converting schemes, selecting one file converting scheme among the plurality of file converting schemes, based on a received input, and performing file converting, based on the selected file converting scheme.

In accordance with an aspect of the disclosure, an electronic device for securing a storage space is provided. The electronic device includes a display, a memory, and a processor operatively coupled to the display and the memory. The processor is configured to identify whether to apply a storage space securing function for the memory, control the display to display a user interface (UI) indicating a storage space of the memory, receive an input for identifying the storage space, and perform file converting, based on a key file and a file converting scheme which correspond to the input.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
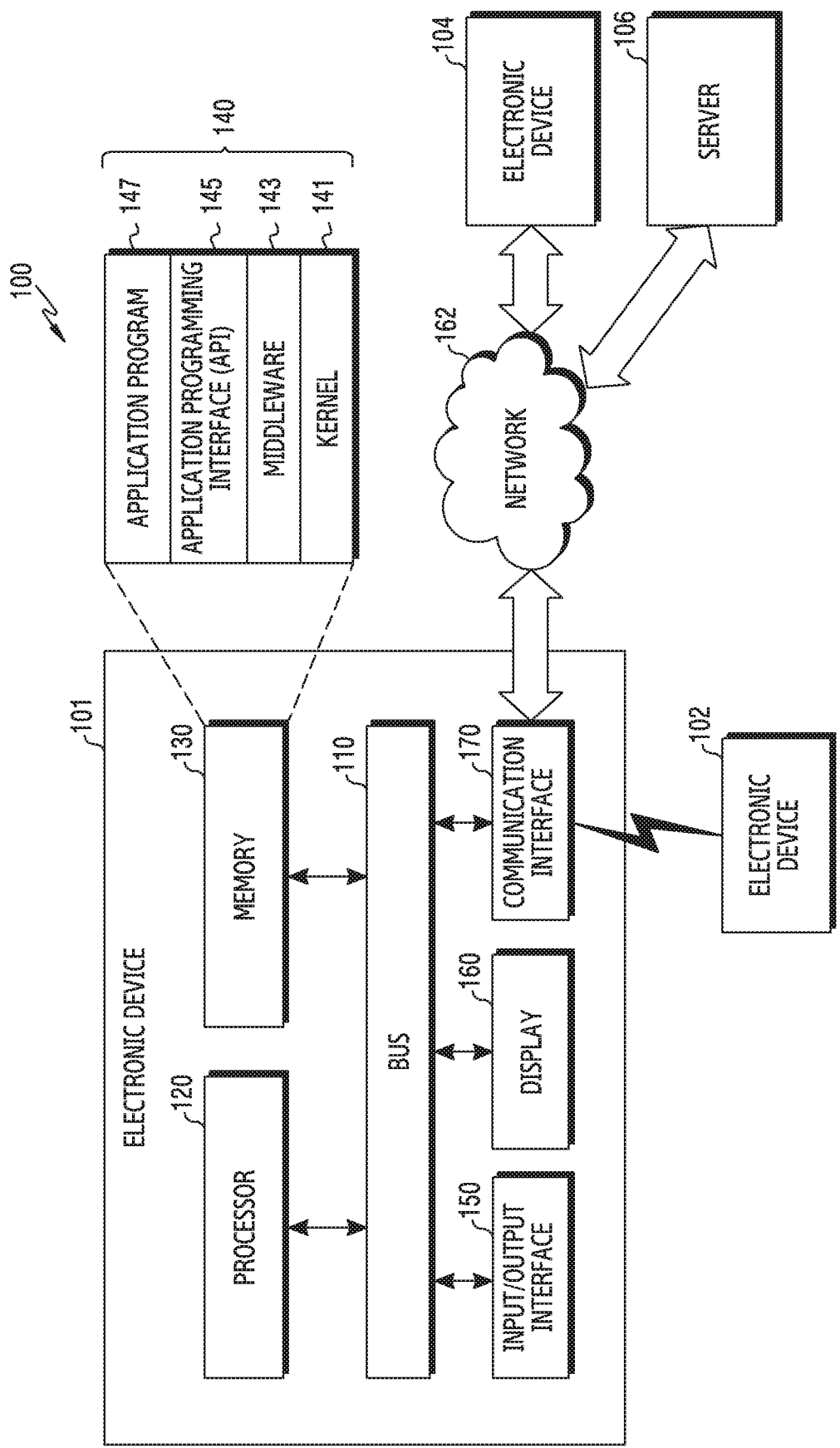
FIG. 1 illustrates a network environment including an electronic device according to various embodiments of the disclosure.

The following description with reference to the accompanying drawings is provided to assist in a comprehensive understanding of various embodiments of the It disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expression "configured (or set) to~," used in the present document may be used interchangeably with, for example, "suitable for~," "having the capacity to~," "designed to~," "adapted to~," "made to~," or "capable of~" in a hardware or software manner in accordance to circumstances. In any situation, the expression "device configured to~" may represent that the device is "capable of~" together with other devices or components. For example, the phrase "processor configured (or set) to perform A, B and C" may represent an exclusive processor (e.g., embedded processor) for performing a corresponding operation, or a generic-purpose processor (e.g., a central processing unit (CPU) or an application processor (AP)) capable of performing corresponding operations by executing one or more software programs stored in a memory device.

An electronic device according to various embodiments of the present document may, for example, include at least one of a smartphone, a tablet personal computer (PC), a mobile phone, a video phone, an electronic book reader, a desktop PC, a laptop PC, a netbook computer, a workstation, a server, a portable digital assistant (PDA), a portable multimedia player (PMP), an Moving Picture Experts Group phase 1 or phase 2 (MPEG-1 or MPEG-2) audio layer-3 (MP3) player, a medical device, a camera or a wearable device. The wearable device may include at least one of an accessory type (e.g., a watch, a ring, a wristlet, an anklet, a necklace, glasses, a contact lens or a head-mounted-device (HMD)), a fabric or clothing integrated type (e.g., electronic clothes), a human-body mount type (e.g., a skin pad or tattoo) or a bio implantation type (e.g., an implantable circuit). According to certain embodiment, the electronic device may, for example, include at least one of a television (TV), a digital versatile disc (DVD) player, an audio system, a refrigerator, an air conditioner, a cleaner, an oven, a microwave, a washing machine, an air cleaner, a set-top box, a home automation control panel, a security control panel, a media box (for example, Samsung HomeSync™, Apple TV™ or Google TV™), a game console (e.g., Xbox™ or PlayStation™), an electronic dictionary, an electronic locking system, a camcorder or an electronic frame.

In another embodiment, the electronic device may include at least one of various medical devices (e.g., various portable medical measurement devices (e.g., a blood glucose sensor, a heat rate sensor, a blood pressure monitor, a body temperature meter, etc.), magnetic resonance angiography (MRA), magnetic resonance imaging (MRI), computed tomography (CT), a imaging equipment, an ultrasonic instrument, etc.)), a navigation device, a global navigation satellite system (GNSS), an event data recorder (EDR), a flight data recorder (FDR), a car infotainment device, an electronic equipment for ship (e.g., a vessel navigation device, a gyro compass, etc.), avionics, a security device, a car head unit, an industrial or domestic robot, a drone, an automatic teller's machine (ATM) of a financial institution, point of sales (POS) of shops, an internet of things (IoT) device (e.g., an electric bulb, various sensors, a sprinkler device, a fire alarm, a thermostat, a streetlight, a toaster, an exerciser, a hot water tank, a heater, a boiler, etc.).

According to certain embodiment, the electronic device may include at least one of a part of furniture, a building/structure or a car, an electronic board, an electronic signature receiving device, a projector or various metering devices (e.g., tap water, electricity, gas, radio wave metering devices or the like). In various embodiments, the electronic device may be flexible, or be a combination of two or more of the aforementioned various devices. The electronic device according to an embodiment of the document is not limited to the aforementioned devices. In the document, the term 'user' may denote a person who uses the electronic device or a device (e.g., an artificial-intelligent electronic device) which uses the electronic device.

In the document, a file may refer data including content that is provided to a user. For example, an operation of performing file converting for a specified content in an electronic device in order to secure a storage space of a memory may be understood to change properties (e.g., a resolution or a running time) of a file including the corresponding content.

FIG. 1 is a block diagram of a network environment system according to an embodiment of the disclosure.

Referring to FIG. 1, an electronic device 101 within a network environment 100 in various embodiments is described. The electronic device 101 may include a bus 110, a processor 120, a memory 130, an input/output interface 150, a display 160, and a communication interface 170. In some embodiment, the electronic device 101 may omit at least one of the constituent elements or additionally have another constituent element.

The bus 110 may, for example, include a circuit coupling the bus 110, the processor 120, the memory 130, the input/output interface 150, the display 160 and the communication 170 with one another and forwarding communication (e.g., a control message or data) between the constituent elements.

The processor 120 may include one or more of a CPU, an AP or a CP. The processor 120 may, for example, execute operation or data processing for control and/or communication of at least one another constituent element of the electronic device 101.

The memory 130 may include a volatile and/or non-volatile memory. The memory 130 may, for example, store a command or data related to at least one another constituent element of the electronic device 101. According to an embodiment, the memory 130 may store a software and/or program 140. The program 140 may, for example, include a kernel 141, a middleware 143, an application programming interface (API) 145, an application program (or "application") 147, and the like. At least some of the kernel 141, the middleware 143 or the API 145 may be called an operating system (OS).

The kernel 141 may, for example, control or manage system resources (e.g., bus 110, processor 120, memory 130, and the like) that are used for executing operations or functions implemented in other programs (e.g., middleware 143, API 145 or application program 147). Also, the kernel 141 may provide an interface through which the middleware 143, the API 145 or the application program 147 may control or manage the system resources of the electronic device 101 by accessing the individual constituent element of the electronic device 101.

The middleware 143 may, for example, perform a relay role of enabling the API 145 or the application program 147 to communicate and exchange data with the kernel 141. Also, the middleware 143 may process one or more work requests that are received from the application program 147, in accordance with priority. For example, the middleware 143 may grant priority capable of using the system resources (e.g., the bus 110, the processor 120, the memory 130 or the like) of the electronic device 101 to at least one of application programs, and process one or more work requests.

The API 145 is, for example, an interface enabling the application program 147 to control a function provided by the kernel 141 or the middleware 143 and may, for example, include at least one interface or function (e.g., an instruction) for file control, window control, image processing, character control or the like.

The input/output interface 150 may forward a command or data inputted from a user or another external device, to another constituent element(s) of the electronic device 101, or output a command or data received from the another constituent element(s) of the electronic device 101, to the user or another external device.

The display 160 may, for example, include a liquid crystal display (LCD), a light emitting diode (LED) display, an organic light emitting diode (OLED) display, a microelectromechanical systems (MEMS) display or an electronic paper display. The display 160 may, for example, display various contents (e.g., a text, an image, a video, an icon, a symbol and/or the like) to a user. The display 160 may include a touch screen. And, for example, the display 160 may receive a touch, gesture, proximity or hovering input that uses an electronic pen or a part of the user's body.

The communication interface 170 may, for example, establish communication between the electronic device 101 and an external device (e.g., a first external electronic device 102, a second external electronic device 104 or a server 106). For example, the communication interface 170 may be coupled to a network 162 through wireless communication or wired communication, to communicate with the external device (e.g., the second external electronic device 104 or the server 106).

The wireless communication may, for example, include a cellular communication that uses at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM) and the like. According to an embodiment, the wireless communication may, for example, include at least one of Wi-Fi, Bluetooth (BT), Bluetooth low energy (BLE), Zigbee, near field communication (NFC), magnetic secure transmission (MST), radio frequency (RF) or body area network (BAN). According to an embodiment, the wireless communication may include GNSS. The GNSS may, for example, be a global positioning system (GPS), a global navigation satellite system (Glonass), Beidou navigation satellite system (hereinafter, "Beidou")) or Galileo, the European global satellite-based navigation system. Hereinafter, the "GPS" may be used interchangeably with the "GNSS". The wired communication may, for example, include at least one of a universal serial bus (USB), a high definition multimedia interface (HDMI), a recommended standard-232 (RS-232), power line communication (PLC), a plain old telephone service (POTS), and the like.

The network 162 may include at least one of a telecommunications network, for example, a computer network (e.g., local area network (LAN) or wide area network (WAN)), the Internet or a telephone network.

Each of the first and second external electronic devices 102 and 104 may be a device of the same or different type from that of the electronic device 101. According to various embodiments, all or some of operations executed in the electronic device 101 may be executed in another one electronic device or a plurality of electronic devices (e.g., the first and second external electronic devices 102 and 104 or the server 106). According to an embodiment, in case where the electronic device 101 performs some function or service automatically or in response to a request, the electronic device 101 may, instead of or additionally to executing the function or service in itself, send a request for execution of at least a partial function associated with this to another device (e.g., the first or second external electronic device 102, 104 or server 106). Another electronic device (e.g., the first or second external electronic device 102, 104 or server 106) may execute the requested function or additional function, and forward the execution result to the electronic device 101. The electronic device 101 may process the received result as it is or additionally, to provide the requested function or service. For this, a cloud computing, distributed computing or client-server computing technology may be used, for example.

According to various embodiments, the processor 120 may be operatively coupled to the display 160 and the memory 130 and perform a general operation for securing a storage space. The processor 120 may be additionally coupled to at least one of other components included in the electronic device 101 besides the display 160 and the memory 130, and perform the general operation for securing the storage space.

In various embodiments, the processor 120 may identify a residual level (e.g., remaining capacity or remaining storage space) of a storage space of the memory 130. The processor 120 may identify the residual level of the storage space of the memory 130 every predefined (or designated) period (e.g., a day, three days, or Sunday), or identify the residual level of the storage space of the memory 130 whenever a specified event takes place. The specified event may include an operation of receiving a user input, an operation of installing an application in the electronic device 101, or an operation of connecting the electronic device 101 to a cloud server (e.g., the server 106) by using wired, wireless communication.

In various embodiments, the processor 120 may identify whether to apply a storage space securing function, based on the residual level of the storage space of the memory 130. The storage space securing function may include a series of operations (e.g., file list displaying (or selecting), file converting scheme displaying (or selecting), file converting execution or the like) for securing the storage space capable of storing content in the memory 130. In various embodiments, in response to the residual level (e.g., remaining capacity) of the storage space of the memory 130 being less than a predefined (or designated) threshold value, the processor 120 may identify to apply the storage space securing function. In an embodiment, the threshold value may include a fixed value, or be adaptively identified based on a user use pattern. For example, in response to an application (e.g., a game application) or content (e.g., a video and a high-quality image) requiring many storage spaces during a given period of time being stored in the memory 130 or in response to frequent update taking place in the electronic device 101, the processor 120 may configure the threshold value as a higher value (e.g., 100 1\4B, 1 GB), because a user of the electronic device 101 makes much use of the storage space of the memory 130. For another example, in response to an application (e.g., a schedule management application) or content (e.g., a document) requiring less storage space during a given period of time being stored in the memory 130, the processor 120 may configure the threshold value as a lower value (e.g., 10 MB, 50 MB), because the user of the electronic device 101 makes less use of the storage space of the memory 130. In various embodiments, although the residual level of the storage space of the memory 130 is equal to or is greater than the predefined threshold value, the processor 120 may identify to apply the storage space securing function in response to a user input for applying the storage space securing function being received.

In various embodiments, the processor 120 may control the display 160 to display at least one of a file converting scheme list and a file list, based on identifying to apply the storage space securing function for the memory 130. The file converting scheme list includes various file converting schemes that the processor 120 uses to reduce a file size. For example, the file converting scheme list may include a resolution converting scheme (e.g., converting from high resolution to low resolution) of a file, a running time reducing scheme (e.g., converting from one hour to 20 minutes) or time lapse effect applying scheme (e.g., converting from one hour to 30 minutes). The file list may include a plurality of files whose file converting may be performed. In an embodiment, in response to the processor 120 identifying to apply the storage space securing function for the memory 130, the processor 120 may control the display 160 to display a convertible file list and a file converting scheme list corresponding to each file. In another embodiment, in response to the processor 120 identifying to apply the storage space securing function for the memory 130, the processor 120 may control the display 160 to display the convertible file list. In this case, in response to a user input of selecting at least one file among a plurality of files included in the displayed file list being obtained, the processor 120 may control the display 160 to display a file converting scheme corresponding to the selected at least one file.

In various embodiments, the processor 120 may control the display 160 to display convertible at least one file in sequence according to a priority of each file, in order to secure a storage space of the memory 130. The priority may refer the order of files displayed on the display 160 among the files. In other words, the electronic device 101 may propose that a user preferentially performs file converting for a file of high priority. The processor 120 may identify a priority of each file, based on various references. For example, the processor 120 may identify the priority of each file, based on a file size, a date storing a file, a date creating the file, the number of file running, a file type, a filename extension, or a combination thereof. The file type may include a video, an audio, an image, or a document.

In various embodiments, the processor 120 may control the display 160 to display a thumbnail of a file displayed on the display 160. For example, in response to a hovering input for a file displayed on the display 160 being received, the processor 120 may control the display 160 to display a thumbnail of the file corresponding to the hovering input.

In various embodiments, the processor 120 may perform file converting, based on at least one file converting scheme used to secure a storage space of the memory 130. In an embodiment, before the file converting is performed, the processor 120 may control the display 160 to display a file converting result expected value. In response to a selected file being converted in the selected file converting scheme, the file converting result expected value may represent an expected value of a secured storage space (or a residual level of the storage space). In an embodiment, in response to the file converting execution being completed, the processor 120 may store metadata about the converted file in the memory 130. The metadata is used to perform the restoring of the converted file. For example, in response to a resolution of a specified file being converted from a high resolution to a low resolution, the processor 120 may store, in the memory 130, metadata indicating information on an identifier of the converted file and a resolution of the original file.

In various embodiments, in response to the processor 120 identifying to apply the storage space securing function, the processor 120 may control the display 160 to display a key file corresponding to an input for identifying a storage space and a file converting scheme corresponding to the key file (or a file converting scheme applicable to the key file). The input for identifying the storage space may refer a storage space of the memory 130 that a user of the electronic device 101 desires to secure. The key file (or may be referred to as a representative file) may refer one file whose priority is highest among a convertible plurality of files. In an embodiment, to receive the input for identifying the storage space, the processor 120 may control the display 160 to display a user interface (UI) representing a state of the storage space (i.e., storage space state). The UI representing the storage space state may be displayed in various forms. For example, the UI representing the storage space state may be displayed in the form of a bar graph, a circle graph or a table. For example, in response to an input for identifying a storage space of 1 GB being received, the processor 120 may identify, as a key file, one file (e.g., a video file) whose priority is highest among a plurality of convertible files stored in the memory 130. In this case, the processor 120 may identify a file converting scheme (e.g., a resolution converting scheme or a running time reducing scheme) capable of decreasing, by 1 GB, a file size of the identified key file.

Figure 2:
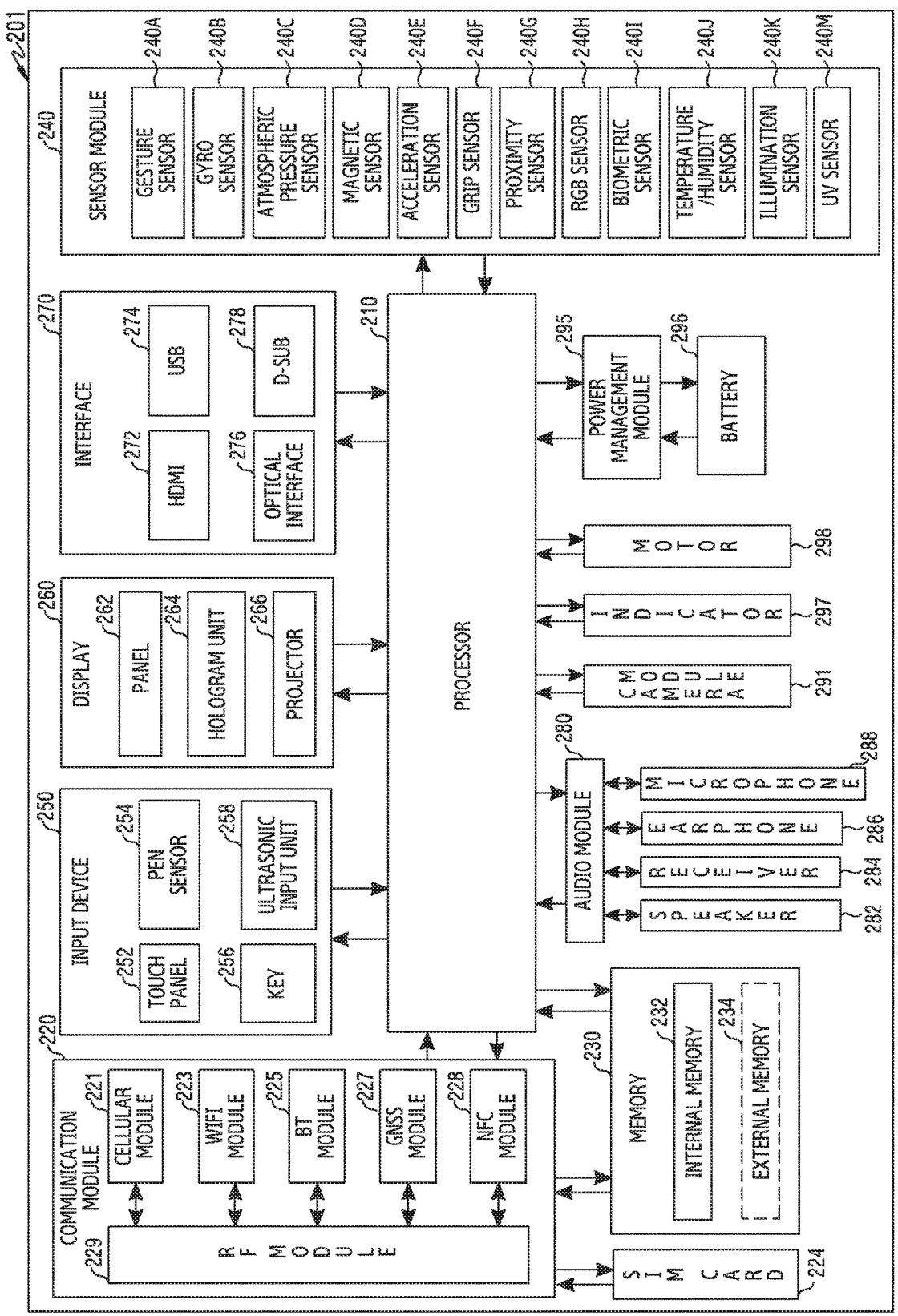
FIG. 2 illustrates a block diagram of an electronic device according to various embodiments of the disclosure.

FIG. 2 is a block diagram of an electronic device according to an embodiment of the disclosure.

Referring to FIG. 2, an electronic device 201 may, for example, include the entire or part of the electronic device 101 illustrated in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297 and a motor 298.

The one or more processors 210 may, for example, drive an operating system or an application program to control a majority of hardware or software constituent elements coupled to the one or more processors 210, and may perform various data processing and operations. The one or more processors 210 may be, for example, implemented as a system on chip (SoC). According to an embodiment, the one or more processors 210 may further include a graphic processing unit (GPU) and/or an image signal processor (ISP). The one or more processors 210 may include at least some (e.g., cellular module) of the constituent elements illustrated in FIG. 2 as well. The one or more processors 210 may load a command or data received from at least one of the other constituent elements (e.g., non-volatile memory), to a volatile memory, to process the loaded command or data, and store the result data in the non-volatile memory.

The communication module 220 may, for example, have the same or similar construction with the communication interface 170. The communication module 220 may, for example, include a cellular module 221, a Wi-Fi module 223, a Bluetooth (BT) module 225, a GNSS module 227, an NFC module 228, and a RF module 229.

The cellular module 221 may, for example, provide voice telephony, video telephony, a text service, an Internet service or the like through a telecommunication network. According to an embodiment, the cellular module 221 may perform the distinction and authentication of the electronic device 201 within the telecommunication network, by using the subscriber identification module (e.g., SIM card) 224. According to an embodiment, the cellular module 221 may perform at least some functions among functions that the one or more processors 210 may provide. According to an embodiment, the cellular module 221 may include a CP. According to some embodiment, at least some (e.g., two or more) of the cellular module 221, the Wi-Fi module 223, the Bluetooth module 225, the GNSS module 227 or the NFC module 228 may be included within one integrated chip (IC) or IC package.

The RF module 229 may, for example, transceive a communication signal (e.g., RF signal). The RF module 229 may, for example, include a transceiver, a power amplifier module (PAM), a frequency filter, a low noise amplifier (LNA), an antenna or the like. According to another embodiment, at least one of the cellular module 221, the Wi-Fi module 223, the Bluetooth module 225, the GNSS module 227 or the NFC module 228 may transceive an RF signal through a separate RF module.

The subscriber identification module 224 may, for example, include a card including a subscriber identification module and/or an embedded subscriber identity module (SIM). And, the subscriber identification module 224 may include unique identification information (e.g., integrated circuit card identifier (ICCID)) or subscriber information (e.g., international mobile subscriber identity (IMSI)).

The memory 230 (e.g., memory 130) may, for example, include an internal memory 232 or an external memory 234. The internal memory 232 may, for example, include at least one of a volatile memory (e.g., a dynamic random access memory (DRAM), a static RAM (SRAM), a synchronous dynamic RAM (SDRAM) or the like) and a non-volatile memory (e.g., one time programmable read only memory (OTPROM), a programmable ROM (PROM), an erasable PROM (EPROM), an electrically EPROM (EEPROM), a mask ROM, a flash ROM, a flash memory, a hard drive or a solid state drive (SSD)). The external memory 234 may include a flash drive, for example, a compact flash (CF), a secure digital (SD), a micro-SD, a mini-SD, an extreme Digital (xD), a multi media card (MMC), a memory stick or the like. The external memory 234 may be operatively or physically coupled with the electronic device 201 through various interfaces.

The sensor module 240 may, for example, measure a physical quantity or sense an activation state of the electronic device 201, to convert measured or sensed information into an electrical signal. The sensor module 240 may, for example, include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K or an ultra violet (UV) sensor 240M. Additionally or alternatively, the sensor module 240 may, for example, include an E-nose sensor, an electromyography (EMG) sensor, an electroencephalogram (EEG) sensor, an electrocardiogram (ECG) sensor, an infrared (IR) sensor, an iris scan sensor and/or a finger scan sensor. The sensor module 240 may further include a control circuit for controlling at least one or more sensors belonging therein. In some embodiment, the electronic device 201 may further include a processor configured to control the sensor module 240 as a part of the one or more processors 210 or separately, thereby controlling the sensor module 240 while the one or more processors 210 is in a sleep state.

The input device 250 may, for example, include a touch panel 252, a (digital) pen sensor 254, a key 256 or an ultrasonic input device 258. The touch panel 252 may, for example, use at least one scheme among a capacitive overlay scheme, a pressure sensitive scheme, an infrared beam scheme or an ultrasonic scheme. Also, the touch panel 252 may further include a control circuit as well. The touch panel 252 may further include a tactile layer, to provide a tactile response to a user. The (digital) pen sensor 254 may, for example, be a part of the touch panel 252, or include a separate sheet for recognition. The key 256 may, for example, include a physical button, an optical key or a keypad. The ultrasonic input device 258 may sense an ultrasonic wave generated in an input tool, through a microphone (e.g., microphone 288), to confirm data corresponding to the sensed ultrasonic wave.

The display 260 (e.g., the display 160) may include a panel 262, a hologram device 264, a projector 266, and/or a control circuit for controlling them. The panel 262 may, for example, be implemented to be flexible, transparent, or wearable. The panel 262 may be constructed as one or more modules together with the touch panel 252.

The hologram device 264 may show a three-dimensional image to the air using an interference of light. The projector 266 may project light onto a screen, to display an image. The screen may, for example, be located inside or outside the electronic device 201.

The interface 270 may, for example, include an HDMI 272, a USB 274, an optical interface 276 or a D-subminiature (D-sub) 278. The interface 270 may, for example, be included in the communication interface 170 illustrated in FIG. 1. Additionally or alternatively, the interface 270 may, for example, include a Mobile high-definition link (MHL) interface, an SD card/MMC interface or an Infrared Data Association (IrDA) standard interface.

The audio module 280 may, for example, convert a sound and an electrical signal interactively. At least some constituent elements of the audio module 280 may be, for example, included in the input/output interface 150 illustrated in FIG. 1. The audio module 280 may for example, process sound information that is inputted or outputted through a speaker 282, a receiver 284, an earphone 286, the microphone 288 or the like.

The camera module 291 is, for example, a device able to photograph a still image and a video. According to an embodiment, the camera module 291 may include one or more image sensors (e.g., front sensor or rear sensor), a lens, an image signal processor (ISP) or a flash (e.g., an LED, a xenon lamp or the like).

The power management module 295 may, for example, manage the electric power of the electronic device 201. According to an embodiment, the power management module 295 may include a power management integrated circuit (PMIC), a charger IC or a battery or fuel gauge. The PMIC may, for example, employ a wired and/or wireless charging scheme. The wireless charging scheme may, for example, include a magnetic resonance scheme, a magnetic induction scheme, an electromagnetic wave scheme or the like. And, the wireless charging scheme may further include a supplementary circuit for wireless charging, for example, a coil loop, a resonance circuit, a rectifier or the like. The battery gauge may, for example, measure a level of the battery 296, a voltage being in charge, an electric current or a temperature. The battery 296 may, for example, include a rechargeable battery and/or a solar battery.

The indicator 297 may display a specific state, for example, a booting state, a message state, a charging state or the like of the electronic device 201 or a part (e.g., the one or more processors 210) of the electronic device 201. The motor 298 may convert an electrical signal into a mechanical vibration, and may generate a vibration, a haptic effect or the like. The electronic device 201 may, for example, include a mobile TV support device (e.g., GPU) capable of processing media data according to the standards of digital multimedia broadcasting (DMB), digital video broadcasting (DVB), mediaFlo™ or the like.

Each of the constituent elements described in the document may consist of one or more components, and a name of the corresponding constituent element may be varied according to the kind of the electronic device. In various embodiments, the electronic device (e.g., electronic device 201) may omit some constituent elements, or further include additional constituent elements, or combine some of the constituent elements to configure one entity, but identically perform functions of corresponding constituent elements before combination.

Figure 3:
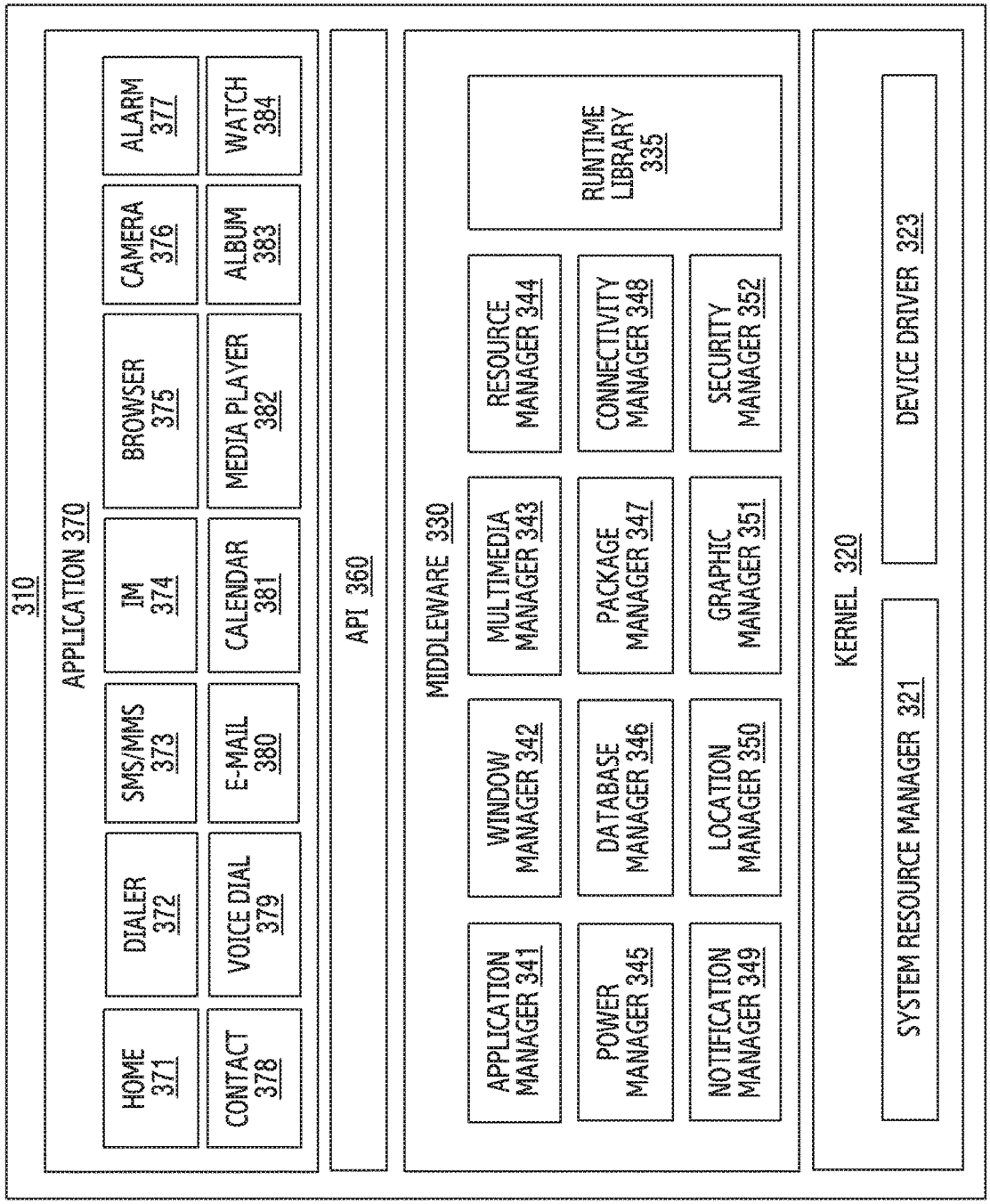
FIG. 3 illustrates a block diagram of a program module according to various embodiments of the disclosure.

FIG. 3 is a block diagram of a program module according to an embodiment of the disclosure.

Referring to FIG. 3, a program module 310 (e.g., the program 140) may include an OS for controlling resources related to an electronic device (e.g., the electronic device 101) and/or various applications (e.g., the application program 147) driven on the operating system. The operating system may, for example, include Android™, iOS™, Windows™, Symbian™, Tizen™ or Bada™.

Referring to FIG. 3, the program module 310 may include a kernel 320 (e.g., the kernel 141), a middleware 330 (e.g., the middleware 143), an API 360 (e.g., the API 145), and/or an application 370 (e.g., the application program 147). At least a part of the program module 310 may be preloaded onto an electronic device, or be downloaded from an external electronic device (e.g., the first or second external electronic device 102, 104, the server 106, etc.).

The kernel 320 may, for example, include a system resource manager 321 and/or a device driver 323. The system resource manager 321 may perform control of a system resource, allocation thereof, recovery thereof or the like. According to an embodiment, the system resource manager 321 may include a process management unit, a memory management unit or a file system management unit. The device driver 323 may, for example, include a display driver, a camera driver, a Bluetooth driver, a shared memory driver, a USB driver, a keypad driver, a Wi-Fi driver, an audio driver or an inter-process communication (IPC) driver.

The middleware 330 may, for example, provide a function that the application 370 commonly needs, or provide various functions to the application 370 through the API 360 so that the application 370 may make use of restricted system resources within an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351 or a security manager 352.

The runtime library 335 may, for example, include a library module that a compiler uses to add a new function through a programming language while the application 370 is executed. The runtime library 335 may perform input output management, memory management or arithmetic function processing.

The application manager 341 may, for example, manage a lifecycle of the application 370. The window manager 342 may manage a graphic user interface (GUI) resource used by a screen. The multimedia manager 343 may detect a format required for playing media files, and perform encoding or decoding of the media file by using a codec suitable to the corresponding format. The resource manager 344 may manage a source code of the application 370 or a space of a memory. The power manager 345 may, for example, manage a battery capacity or a power supply, and provide power information required for an operation of an electronic device. According to an embodiment, the power manager 345 may interwork with a basic input/output system (BIOS). The database manager 346 may, for example, create, search or change a database that will be used by the application 370. The package manager 347 may manage installation or updating of an application that is distributed in a form of a package file.

The connectivity manager 348 may, for example, manage wireless connectivity. The notification manager 349 may, for example, provide events such as an arrival message, an appointment, a proximity notification, etc. to a user. The location manager 350 may, for example, manage location information of an electronic device. The graphic manager 351 may, for example, manage a graphic effect that will be provided to a user, or a user interface related with this. The security manager 352 may, for example, provide system security or user authentication.

According to an embodiment, the middleware 330 may include a telephony manager for managing a voice or video telephony function of an electronic device, or a middleware module capable of forming a combination of functions of the aforementioned constituent elements. According to an embodiment, the middleware 330 may provide a module that is specialized based on the type of an operating system. The middleware 330 may dynamically delete some of the existing constituent elements or add new constituent elements. The API 360 is, for example, a set of API programming functions, and may be provided to have another construction in accordance with the operating system. For example, Android or iOS may provide one API set by platform, and Tizen may provide two or more API sets by platform.

The application 370 may, for example, include a home 371, a dialer 372, a short message service (SMS)/multimedia messaging service (MMS) 373, an instant message (IM) 374, a browser 375, a camera 376, an alarm 377, a contact 378, a voice dial 379, an electronic mail (e-mail) 380, a calendar 381, a media player 382, an album 383, a watch 384, health care (e.g., measuring a momentum, a blood sugar or the like), or an environment information (e.g., air pressure, humidity or temperature information) provision application. According to an embodiment, the application 370 may include an information exchange application that may support information exchange between an electronic device and an external electronic device. The information exchange application may, for example, include a notification relay application for relaying specific information to the external electronic device, or a device management application for managing the external electronic device. For example, the notification relay application may relay notification information generated by another application of an electronic device to an external electronic device, or receive notification information from the external electronic device to provide the received notification information to a user. The device management application may, for example, install, delete or update a function (e.g., turn-on/turn-off of the external electronic device itself (or some constituent components) or adjustment of a brightness (or resolution) of a display) of the external electronic device that communicates with the electronic device, or an application operating in the external electronic device. According to an embodiment, the application 370 may include an application (e.g., a health care application of a mobile medical instrument) designated according to an attribute of the external electronic device. According to an embodiment, the application 370 may include an application received from the external electronic device. At least a part of the program module 310 may be implemented (e.g., executed) by software, firmware, hardware (e.g., the one or more processors 210) or a combination of at least two or more of them, and may include a module for performing one or more functions, a program, a routine, sets of instructions or a process.

The term "module" used in the document may include a unit consisting of hardware, software or firmware and, for example, may be used interchangeably with the terms "logic", "logic block", "component", "circuit" or the like. The "module" may be an integrally configured component or the minimum unit performing one or more functions or a part thereof. The "module" may be implemented mechanically or electronically and, for example, may include an application-specific integrated circuit (ASIC) chip, field-programmable gate arrays (FPGAs) or a programmable logic device, which has been known or will be developed in future, performing some operations. At least a part of an apparatus (e.g., modules or functions thereof) or method (e.g., operations) according to various embodiments may, for example, be implemented by an instruction that is stored in a computer-readable storage media in the form of a program module. In case where the instruction is executed by a processor (e.g., the processor 120), the processor may perform a function corresponding to the instruction. The computer-readable recording media may include a hard disk, a floppy disk, a magnetic media (e.g., a magnetic tape), an optical recording media (e.g., a compact disc-read only memory (CD-ROM) or a DVD), a magneto-optical media (e.g., a floptical disk), an internal memory, etc. The instruction may include a code that is made by a compiler or a code that is executable by an interpreter. The module or program module according to various embodiments may include at least one or more of the aforementioned constituent elements, or omit some, or further include another constituent element. Operations carried out by the module, the program module or the another constituent element according to various embodiments may be executed in a sequential, parallel, repeated or heuristic manner, or at least some operations may be executed in different order or be omitted, or another operation may be added.

As described above, according to various embodiments of the disclosure, an electronic device for securing a storage space may include a display, a memory, and a processor operatively coupled to the display and the memory. The processor may be configured to identify whether to apply a storage space securing function for the memory, control the display to display a file converting scheme list including a plurality of file converting schemes, select one file converting scheme among the plurality of file converting schemes, based on a received input, and perform file converting, based on the selected file converting scheme. The file converting scheme may include a resolution converting scheme of a file stored in the memory, a running time reducing scheme, or a time lapse effect applying scheme.

In an embodiment, the processor may be configured to obtain at least one file whose file converting is available among a plurality of files stored in the memory, identify a priority of the obtained at least one file, control the display to display at least one file whose priority is highest among the at least one file, receive an input of selecting one file among the displayed at least one file, and control the display to display a file converting scheme list corresponding to the received input. In an embodiment, the processor may be configured to identify the priority, based on at least one of a size of the obtained at least one file, a storage date, and/or a running count.

In an embodiment, the processor may be further configured to determine a file converting result expected value, based on the selected file and the selected file converting scheme, and control the display to display the file converting result expected value.

In an embodiment, the processor is further configured to obtain a hovering input on one file among the displayed at least one file, and control the display to display a thumbnail of the file corresponding to the obtained hovering input.

In an embodiment, the processor may be further configured to store, in the memory, metadata about a file of which the file converting has been performed, and the metadata may denote metadata for restoring the file of which the file converting has been performed.

As described above, according to various embodiments, the processor may be configured to identify whether to apply a storage space securing function for the memory, control the display to display a UI indicating a storage space of the memory, receive an input for identifying the storage space, and perform file converting, based on a key file and a file converting scheme which correspond to the received input.

In an embodiment, the processor may be configured to obtain at least one file whose file converting is available among a plurality of files stored in the memory, identify a priority of the obtained at least one file, identify, as a key file, one file whose priority is highest among the at least one file, and identify a file converting scheme, based on the identified key file and the received input.

In an embodiment, the processor may be further configured to control the display to display the key file and the file converting scheme, refine the key file and the file converting scheme, in response to receiving a refresh input, and control the display to display the refined key file and file converting scheme.

A description below is made for an operation method of an electronic device for performing file converting, based on a priority of a file and a plurality of file converting schemes. FIGS. 4, 5, 6, 7, 8A, 8B, 8C, 8D, 9, 10A, 10B, and 11 explain an operation method of an electronic device for suggesting various file converting schemes to a user, and performing file converting, based on user selection. FIGS. 12, 13A, 13B, 13C, 13D, 14, 15A and 15B explain an operation method of an electronic device for recommending various file converting schemes, based on a secured storage space that the user desires. Operations illustrated in FIGS. 4, 5, 6, 7, 8A, 8B, 8C, 8D, 9, 10A, 10B, 11, 12, 13A, 13B, 13C, 13D, 14, 15A, and 15B may be at least one data or function (e.g., instruction) stored in the memory 130. Also, the operations illustrated in FIGS. 4, 5, 6, 7, 8A, 8B, 8C, 8D, 9, 10A, 10B, 11, 12, 13A, 13B, 13C, 13D, 14, 15A, and 15B may be implemented by at least one of the electronic device 101, the server 106, and/or the processor 120 or display 160 included in the electronic device 101.

Figure 4:
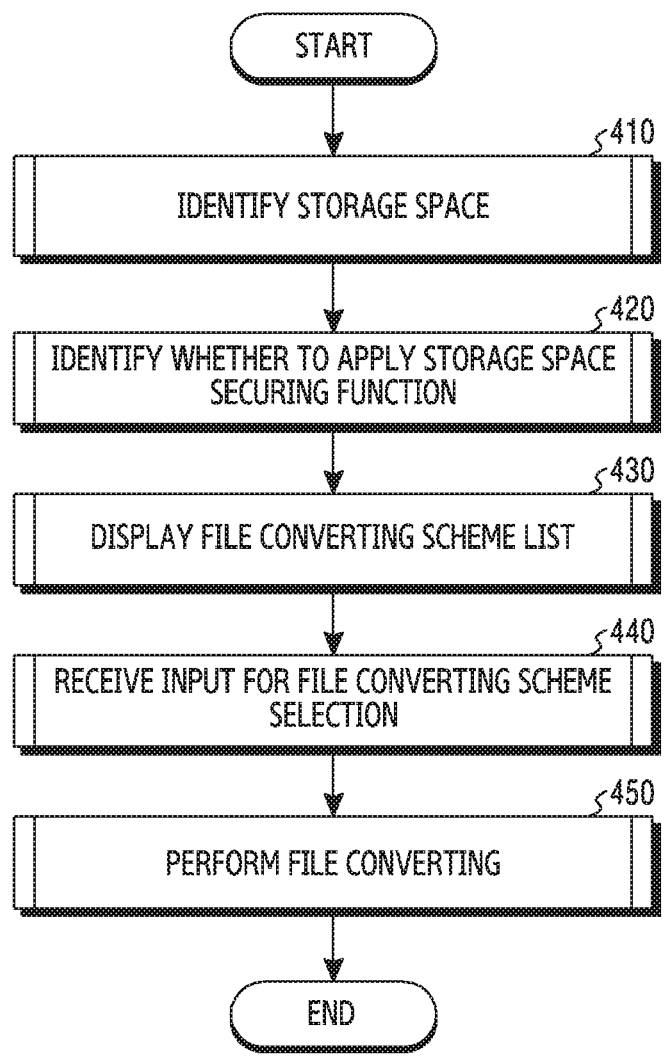
FIG. 4 illustrates a flowchart for performing file converting, based on an input of selecting a file converting scheme in an electronic device according to various embodiments of the disclosure.

FIG. 4 illustrates a flowchart for performing file converting, based on an input of selecting a file converting scheme in the electronic device 101 according to various embodiments.

Referring to FIG. 4, in operation 410, the processor 120 identifies a residual level of a storage space of the memory 130. In other words, the processor 120 identifies how much storage space of the memory 130 remains. For example, the processor 120 may identify the storage space of the memory 130 every predefined period (e.g., a day, three days, or a week). For another example, the processor 120 may identify the storage space whenever receiving a user input. For further example, the processor 120 may identify the storage space whenever installing an application in the electronic device 101. For still another example, the processor 120 may identify the residual level of the storage space whenever the electronic device 101 connects with a cloud server (e.g., the server 106) by using wired and/or wireless communication.

In operation 420, the processor 120 identifies whether to apply a storage space securing function, based on the residual level of the storage space. The storage space securing function may include a series of operations for securing the storage space capable of storing content in the memory 130. In an embodiment, in response to the storage space of the memory 130 being insufficient, the processor 120 may identify to apply the storage space securing function. For example, in response to the storage space remaining in the memory 130 being less than a predefined threshold value (e.g., 10 MB, 50 MB, or 100 MB), the processor 120 may identify that the storage space is insufficient. In another embodiment, even though the storage space of the memory 130 not being insufficient, the processor 120 may identify to apply the storage space securing function in response to a user input being received.

In operation 430, the processor 120 controls the display 160 to display a file converting scheme list, in response to identifying to apply the storage space securing function. The file converting scheme list includes various file converting schemes that the processor 120 uses to reduce a file size. For example, the file converting scheme list may include a resolution converting scheme of a file, a running time reducing scheme, or a time lapse effect applying scheme.

In an embodiment, the processor 120 may control the display 160 to display, in random order, a plurality of file converting schemes included in the file converting scheme list. In another embodiment, the processor 120 may control the display 160 to display the plurality of file converting schemes, based on predefined order or based on order identified according to user designation. In further embodiment, the processor 120 may identify the order of displaying the plurality of file converting schemes, based on the number of times of selecting each file converting scheme during a specified period of time. For example, in response to it being identified that the resolution converting scheme has been most selected during the specified period of time (e.g., three days, a week, or a month), the processor 120 may control the display 160 to display the resolution converting scheme at a top of the file converting scheme list.

In an embodiment, though not illustrated in FIG. 4, the processor 120 may control the display 160 to display a file list together with the file converting scheme list. The file list includes a plurality of files that are objects of file converting execution. An embodiment in which the file converting scheme list and the file list are displayed together is described in FIG. 9 in more detail. In another embodiment, the processor 120 may first display the file list and in response to a specified file being selected from the file list, the processor 120 may control the display 160 to display a file converting scheme list corresponding to the selected file. An embodiment of first displaying the file list is described in FIG. 7 in more detail.

In operation 440, the processor 120 receives an input of selecting at least one file converting scheme from the file converting scheme list displayed on the display 160. The processor 120 may receive an input of selecting a file converting scheme according to various schemes. In an embodiment, the processor 120 may receive the input through the input/output interface 150 (e.g., a keyboard, a mouse, or a microphone). In another embodiment, in response to the display 160 being capable of obtaining a touch input, a hovering input, or a pressure input, the processor 120 may receive the input of selecting the file converting scheme through the display 160.

In operation 450, the processor 120 performs file converting, based on the input of selecting the file converting scheme. In an embodiment, the processor 120 may perform the file converting scheme, without receiving a separate input after the selected file converting scheme is displayed on the display 160. In another embodiment, after the selected file converting scheme is displayed on the display 160, the processor 120 may perform the file converting after receiving an input for file converting execution.

Figure 5:
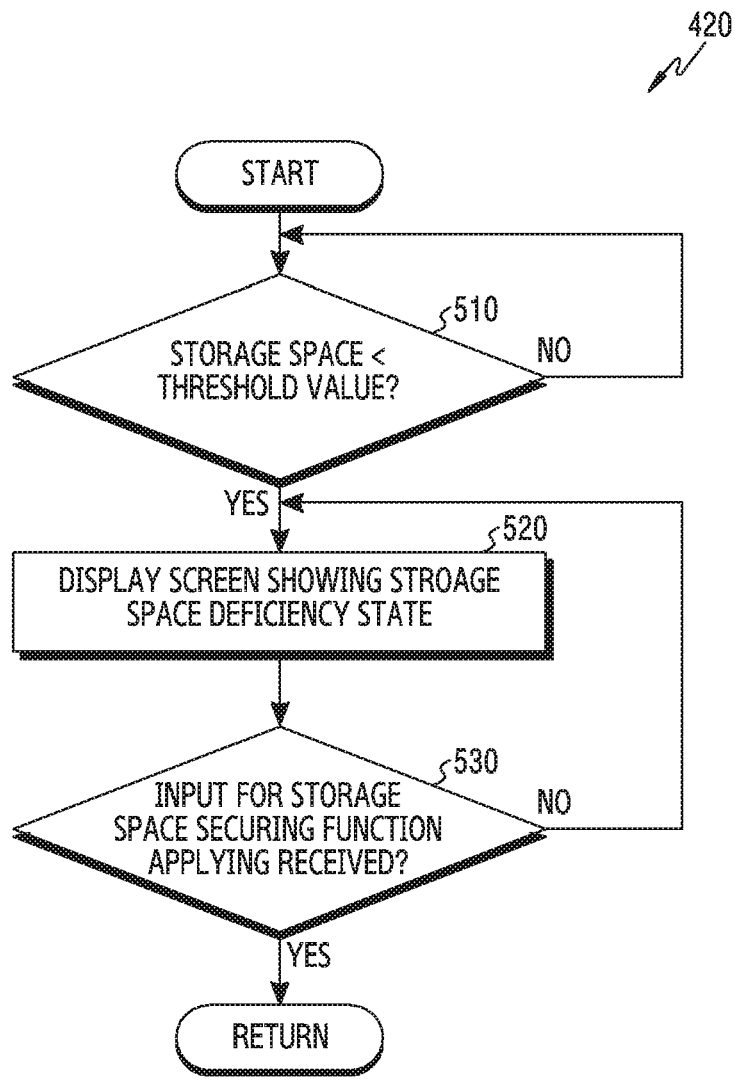
FIG. 5 illustrates a flowchart for identifying whether to apply a storage space securing function in an electronic device according to various embodiments of the disclosure.
Figure 6:
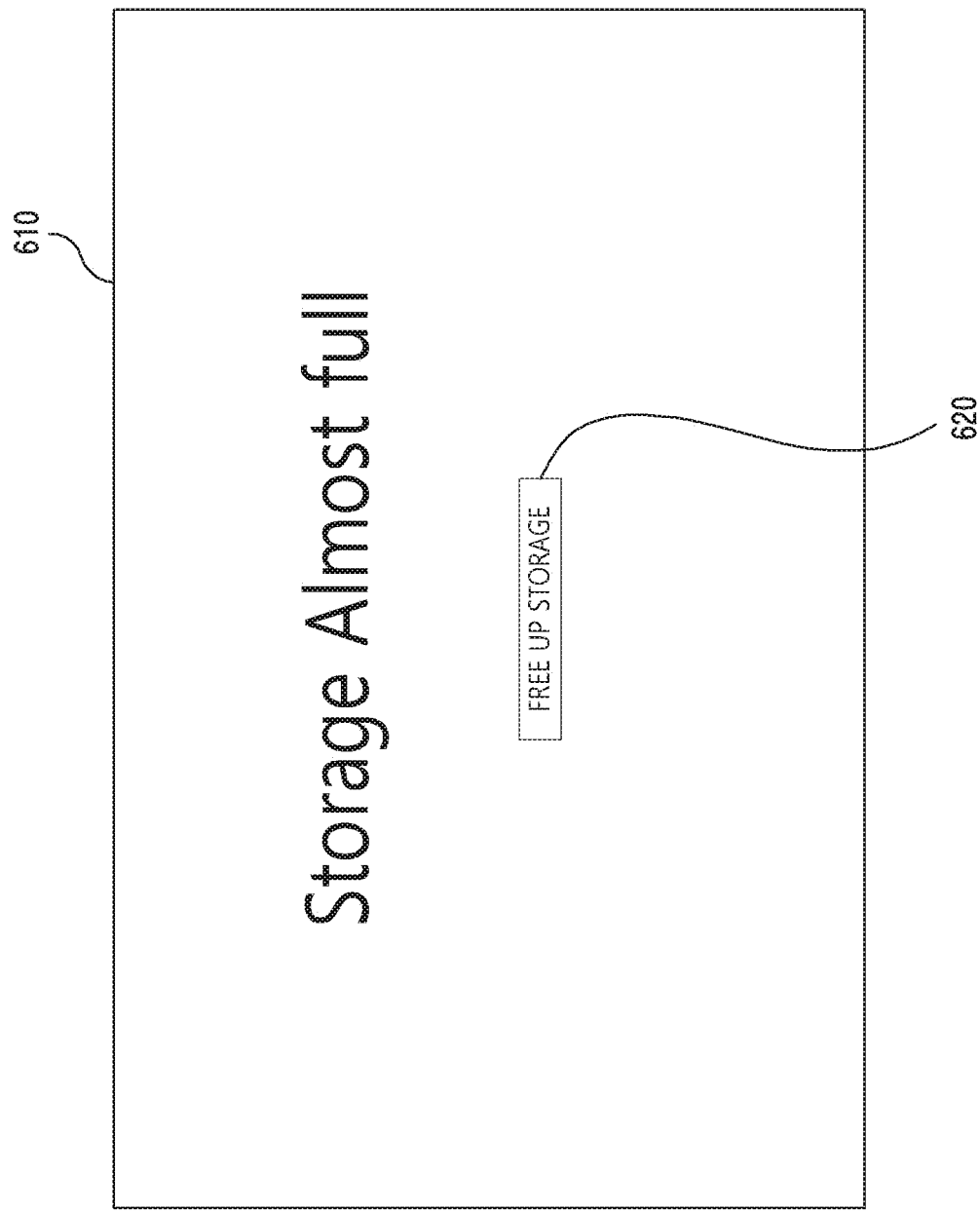
FIG. 6 illustrates a screen showing a storage space deficiency state according to various embodiments of the disclosure.

FIG. 5 illustrates a flowchart for identifying whether to apply a storage space securing function in an electronic device according to various embodiments. FIG. 6 illustrates a screen showing a storage space deficiency state according to various embodiments. FIG. 5 illustrates an embodiment of applying the storage space securing function in response to a storage space of the memory 130 being insufficient in operation 420 of FIG. 4.

Referring to FIGS. 5 and 6, in operation 510, the processor 120 may identify whether a storage space remaining in the memory 130 is less than a predefined threshold value, periodically every specified period of time or in response to a specified event taking place (e.g., a user input being received). In response to the storage space remaining in the memory 130 being equal to or being greater than the predefined threshold value, the processor 120 may again compare the residual level of the storage space of the memory 130 and the predefined threshold value in response to a next period arriving or a next event occurring. In response to the storage space remaining in the memory 130 being less than the predefined threshold value, the processor 120 performs operation 520.

In operation 520, in response to the storage space remaining in the memory 130 being less than the predefined threshold value, the processor 120 controls the display 160 to display a screen showing a storage space deficiency state. For example, as illustrated in FIG. 6, the processor 120 may control the display 160 to display a screen 610 showing the storage space deficiency state. The screen 610 may include an object 620 receiving an input for applying a storage space securing function. A specified text displayed on the screen 610 or objects such as an icon, a button, etc. are merely examples, and embodiments of the disclosure are not limited to the corresponding text or objects.

In operation 530, the processor 120 identifies whether an input for storage space securing function applying is received. In response to the input for the storage space securing function applying not being received, the processor 120 may control the display 160 to continuously display the screen 610. In response to the input for the storage space securing function applying being received, the processor 120 may apply the storage space securing function.

Though not illustrated in FIG. 5, in an embodiment, in response to a specified time elapsing while the input for the storage space securing function applying is not received, the processor 120 may automatically apply the storage space securing function. In more detail, the processor 120 may activate a timer after the screen 610 is displayed on the display 160. In response to the timer expiring in a state in which the input for the storage space securing function applying is not received, the processor 120 may apply the storage space securing function although the user input is not received.

Figure 7:
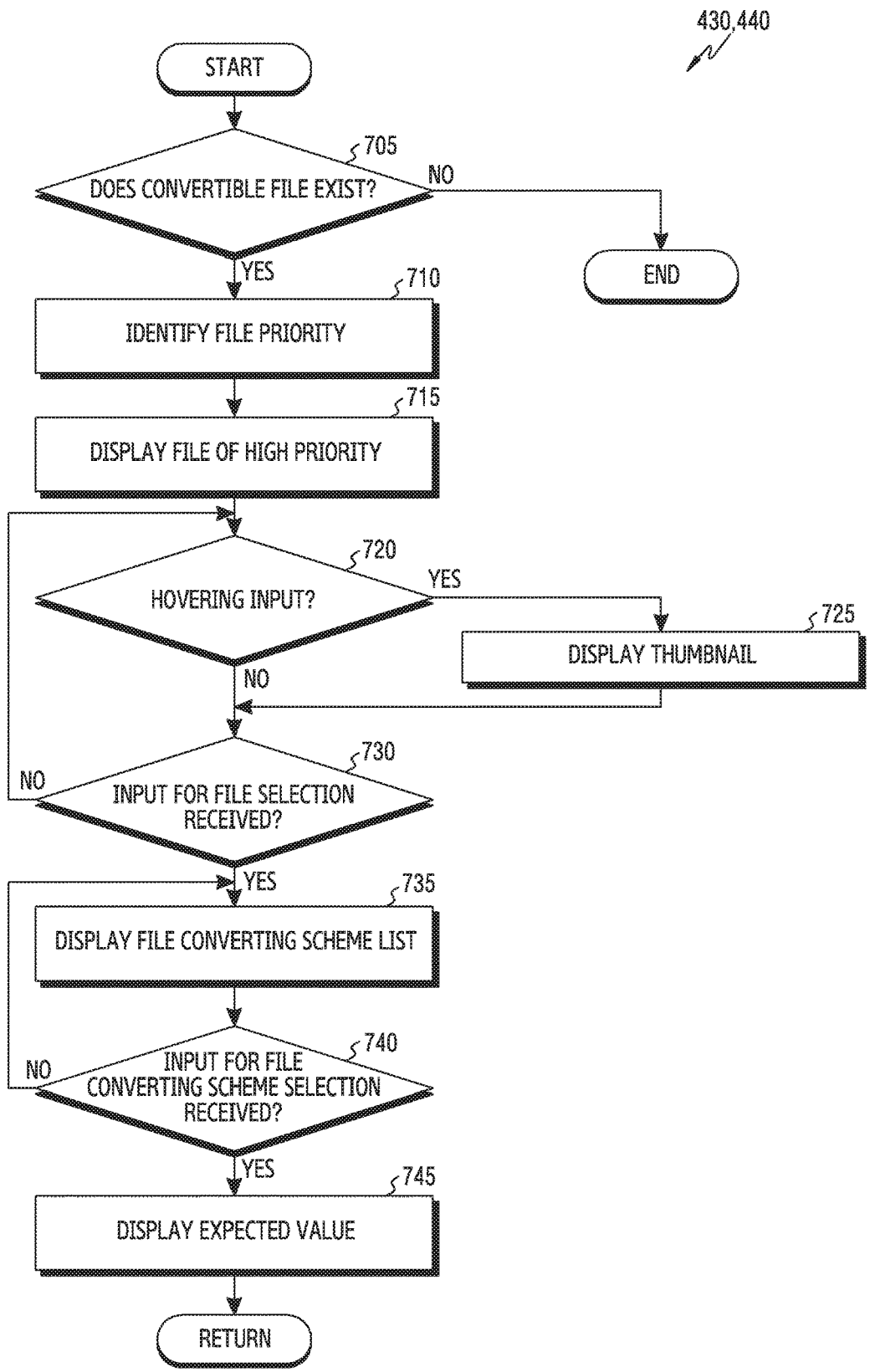
FIG. 7 illustrates a flowchart for selecting a file converting scheme in an electronic device according to various embodiments of the disclosure.

FIG. 7 illustrates a flowchart for selecting a file converting scheme in an electronic device according to various embodiments. FIGS. 8A, 8B, 8C, and 8D illustrate an example for explaining operations illustrated in FIG. 7. FIG. 7 illustrates operations 430 and 440 of FIG. 4 in more detail.

Referring to FIGS. 7, 8A, 8B, 8C and 8D, in operation 705, the processor 120 identifies whether a convertible file exists in the memory 130. In an embodiment, the processor 120 may identify whether the convertible file exists, based on an extension name of the file stored in the memory 130. For example, the extension name of the convertible file may correspond to the following.

TABLE 1

| File type | Extension name |
|---|---|
| Video | WMV MPG, MP4, AVI, ASF, M2TS, 3GP, 3G2, FLV MKV, SWF, WEBM, HTML5, OGG, |
| Image | BMP, GIF, JPEG, PNG, WebP |
| Audio | AAC LC, HE-AACv1(AAC+), HE-AACv2(enhanced AAC+), AAC ELD(enhanced low delay AAC), AMR-NB, AMR-WB, FLAC, MIDI, MP3, Opus, PCM/WAVE, Vorbis |
| Document | .xml, .xlsx, .txt, .pptx, .pdf, .hwp, .html |

In an embodiment, in response to the convertible file not existing in the memory 130, the processor 120 terminates the algorithm, because file converting may not be performed. In this case, the processor 120 may control the display 160 to display a screen proposing the deletion of a file. In another embodiment, in response to convertible at least one file existing in the memory 130, the processor 120 may perform operations of next step. For example, in response to the convertible file existing in plural, the processor 120 may perform an operation 710 for a convertible plurality of files. For another example, although not illustrated in FIG. 7, in response to the convertible file being one in number, in operation 715, the processor 120 may control the display 160 to display the obtained one file, without performing the operation 710.

In operation 710, the processor 120 determines a priority of each of a plurality of files. The priority may refer the order of files displayed on the display 160 among the plurality of files. In an embodiment, the processor 120 may identify a priority of each of the files, based on a file size of each file, a storage date, a creation date, a running count, a file type, an extension name of the file, or a combination thereof. The file type may include a video, an audio, an image, or a document. For example, the processor 120 may identify, as a high priority, a video file of among a plurality of files according to a preset scheme or a user input. In this case, the processor 120 may identify a high priority in order of a file of a big size or a file of a less running count among the video files. Also, the processor 120 may identify the priority, based on the number of selecting a type of a specified file during a specified period of time. For example, in response to it being identified that the video file has been most selected as a file converting object during a specified period of time (e.g., three days, a week, or a month), the processor 120 may identify that the priority of the video file is high.

Figure 8A:
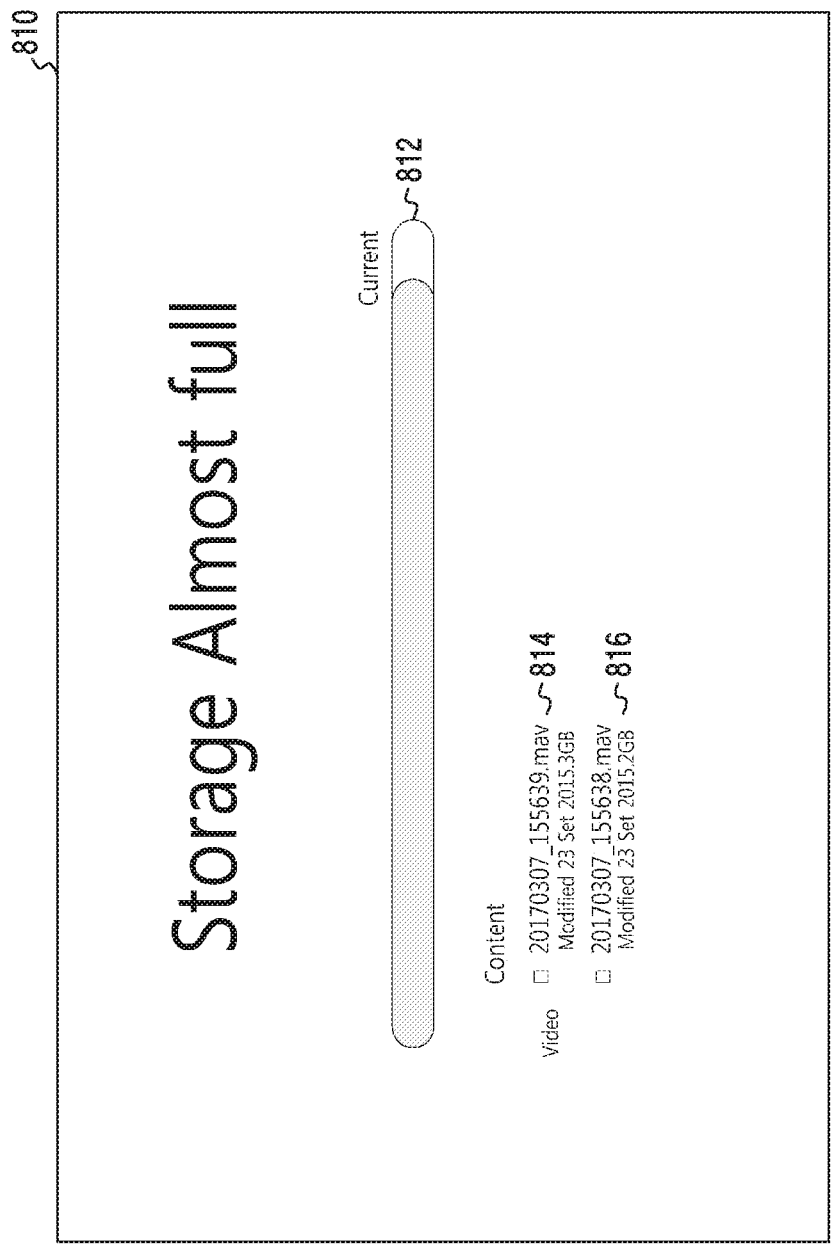
FIG. 8A illustrates a screen showing at least one file of high priority according to various embodiments of the disclosure.

In operation 715, the processor 120 controls the display 160 to display a file list including at least one file of high priority. For example, assume that priorities of video files whose file sizes correspond to 3 GB and 2 GB respectively among a plurality of convertible files are highest. As illustrated in FIG. 8A, the processor 120 may control the display 160 to display a screen 810. The screen 810 may include a graph 812 showing a current storage space state, and a video file name 814 and a video file name 816 of respective two files whose priorities are highest. The video file name 814 and the video file name 816 each may be selected, based on a user input. A specified text displayed on the screen 810 or objects such as an icon, a button, etc. are merely examples, and embodiments of the disclosure are not limited to the corresponding text or objects.

Figure 8B:
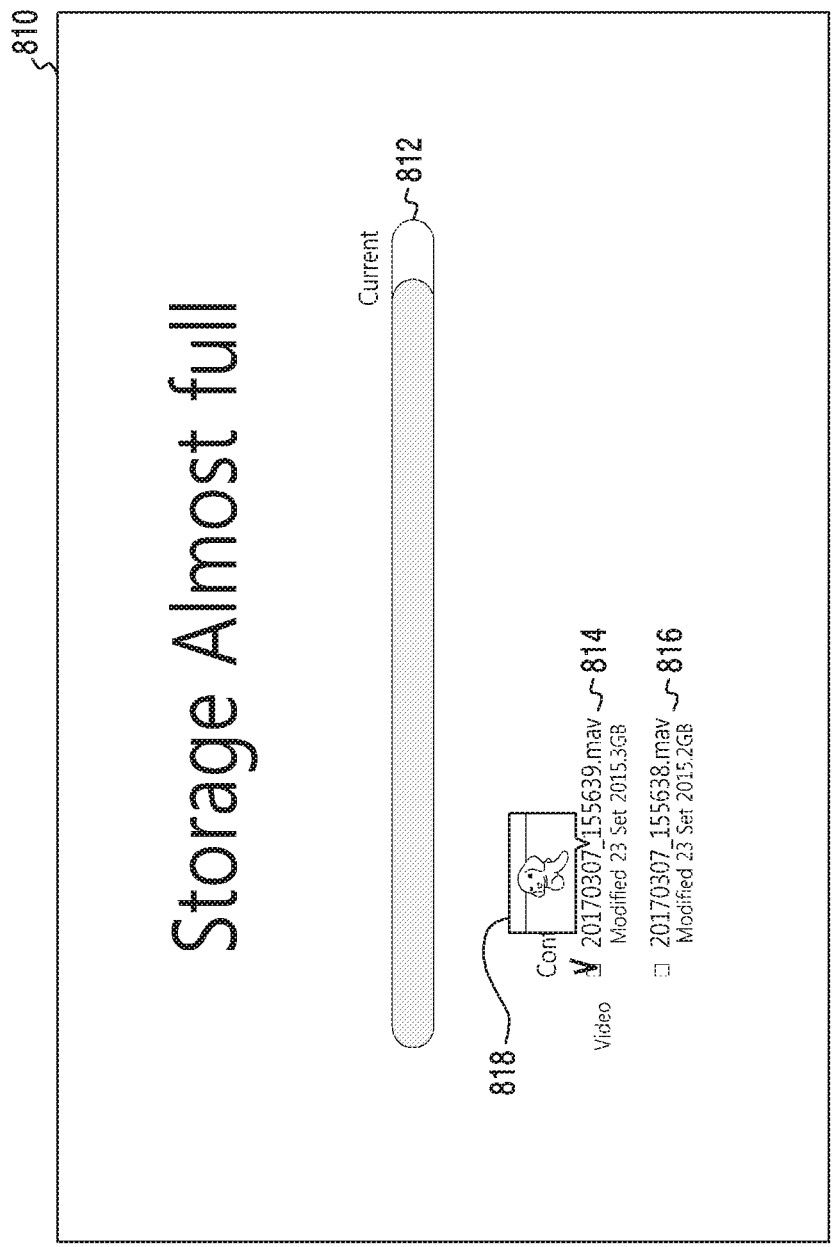
FIG. 8B illustrates a screen showing a thumbnail of a file according to various embodiments of the disclosure.

In operation 720, the processor 120 obtains whether a hovering input for each of the displayed file names is received. In response to the hovering input being received, in operation 725, the processor 120 may control the display 160 to display a thumbnail of a file corresponding to the file name for which the hovering input has been received. For example, as illustrated in FIG. 8B, in response to a hovering input for the video file name 814 being received, the processor 120 may control the display 160 to display a thumbnail 818 of a file corresponding to the video file name 814. A user of the electronic device 101 identifies the thumbnail by using the hovering input, thereby being capable of conveniently identifying the substance of each of the files included in the screen.

In response to the hovering input not being received, in operation 730, the processor 120 obtains whether an input for selecting at least one file among file names included in the screen 810 is received. In response to the input for selecting the file not being received, the processor 120 repeatedly performs operations 720 to 730.

Figure 8C:
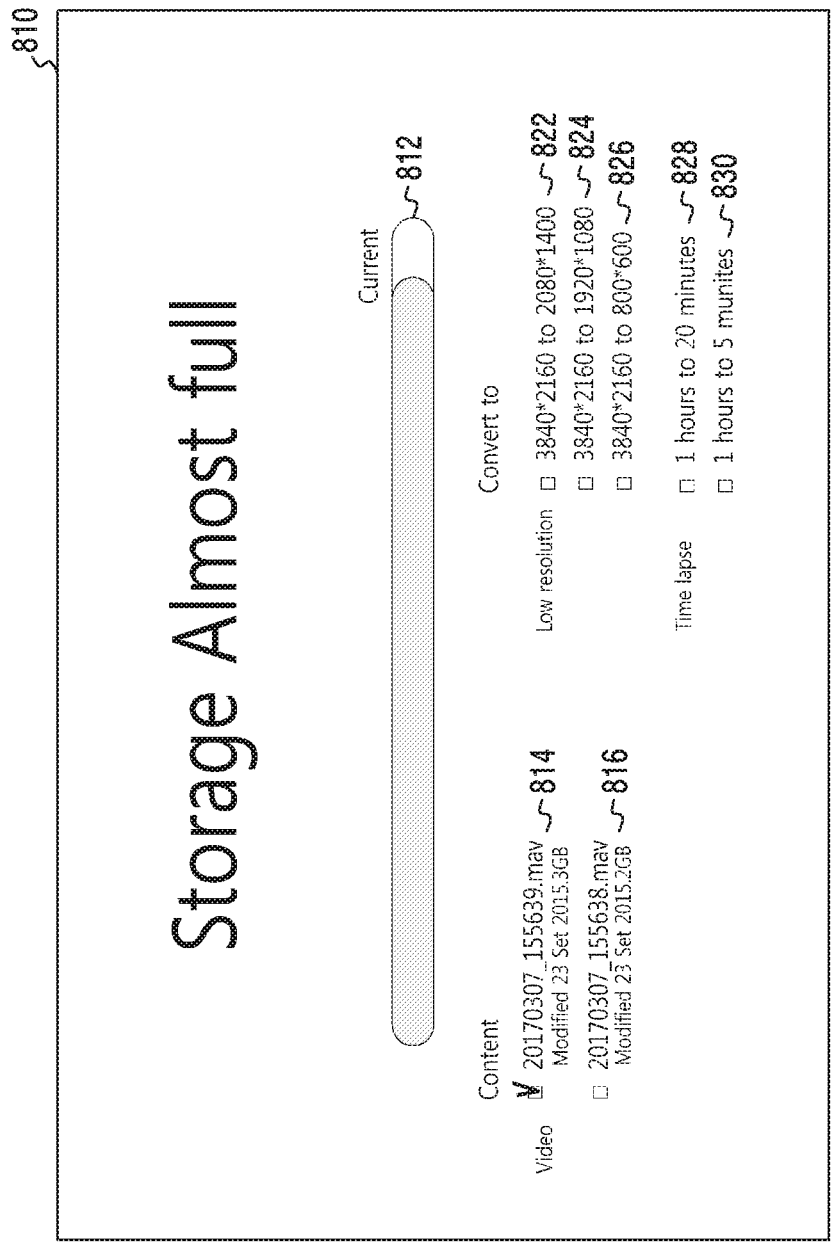
FIG. 8C illustrates a screen showing a file converting scheme list according to various embodiments of the disclosure.

In response to the input for selecting the file being received, in operation 735, the processor 120 controls the display 160 to display a file converting scheme list corresponding to the selected file. For example, as illustrated in FIG. 8C, in response to an input for selecting the video file name 814 being received, the processor 120 may control the display 160 to display file converting schemes 822, 824, 826, 828, and 830 for converting a video file corresponding to the video file name 814. The file converting schemes 822, 824, and 826 each correspond to a converting scheme of changing a resolution of the selected file. The file converting schemes 828 and 830 each correspond to a scheme of applying a time lapse effect to the selected file. Though not illustrated in FIG. 8C, the processor 120 may control the display 160 to display a scheme of reducing a file running time.

In operation 740, the processor 120 obtains whether an input for selecting at least one file converting scheme among the displayed plurality of file converting schemes is received. In response to the input for selecting the file converting scheme not being received, the processor 120 repeatedly performs operations 735 to 740. In response to the input for selecting the file converting scheme being received, the processor 120 performs operation 745.

Figure 8D:
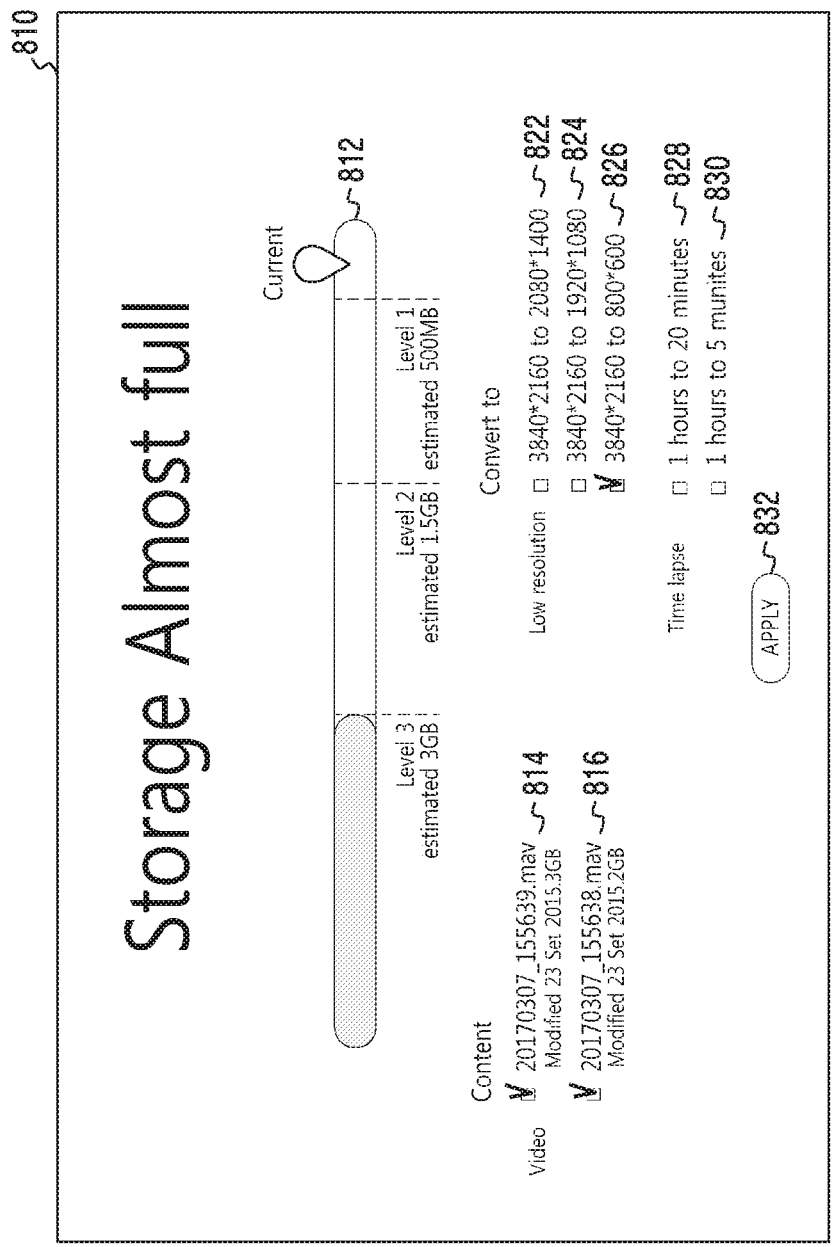
FIG. 8D illustrates an example of a screen showing a file converting result expected value according to various embodiments of the disclosure.

In operation 745, the processor 120 controls the display 160 to display a file converting result expected value that corresponds to the selected file and selected file converting scheme. The file converting result expected value may be displayed in various schemes. For example, as illustrated in FIG. 8D, in response to the video file name 814 and the video file name 816 being selected and the file converting scheme 826 being selected, the processor 120 may determine a storage space (i.e., file converting result expected value) which is secured when video files corresponding to the selected video file names 814 and 816 are converted based on the file converting scheme 826. The processor 120 may control the display 160 to display the file converting result expected value (i.e., 3 GB is estimated to be secured as illustrated in FIG. 8D) on the graph 812. Also, the processor 120 may control the display 160 to display a file converting result expected value of a file converting scheme not selected. For example, as illustrated in FIG. 8D, in response to the video file name 814 and the video file name 816 being selected, the processor 120 may determine file converting result expected values of the file converting scheme 822 and the file converting scheme 824 in addition to the file converting scheme 826. In this case, the processor 120 may control the display 160 to display file converting result expected values (i.e., Level 1, Level 2, and Level 3) of respective file converting schemes. A user identifies the file converting result expected value displayed through the display 160, thereby being capable of identifying an expected secured storage space prior to file converting execution.

FIGS. 7, 8A, 8B, 8C, and 8D explain an example of selecting one file converting scheme, but the processor 120 may determine file converting result expected values for which two or more file converting schemes are applied. For example, the processor 120 may control the display 160 to display the file converting result expected values for which all of the resolution converting scheme (e.g., the file converting scheme 826) and the time lapse effect applying scheme (e.g., the file converting scheme 828) are applied to the file corresponding to the video file name 814.

Figure 9:
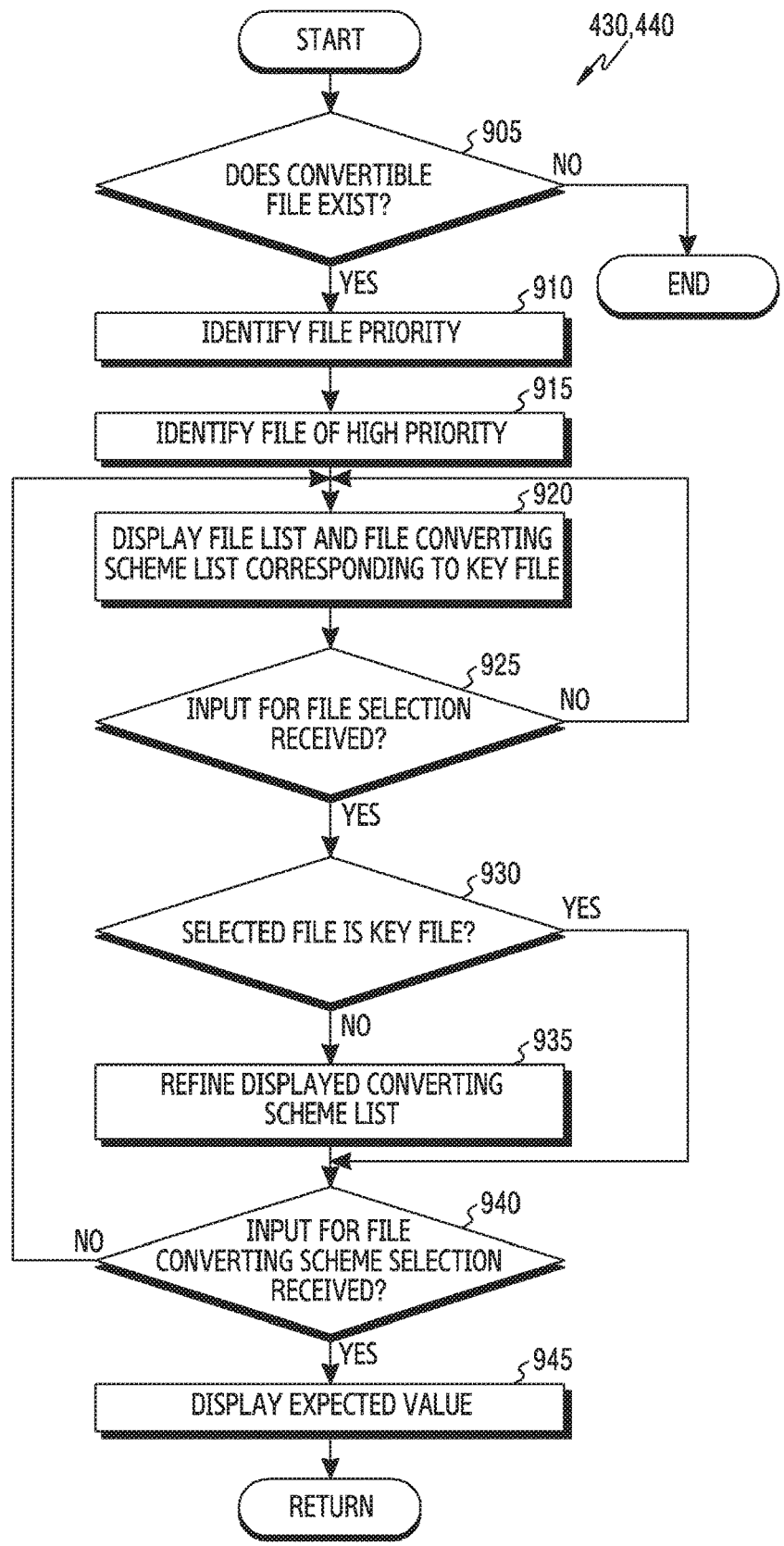
FIG. 9 illustrates a flowchart for displaying a file list of a high priority and a file converting scheme list in an electronic device according to various embodiments of the disclosure.
Figure 10A:
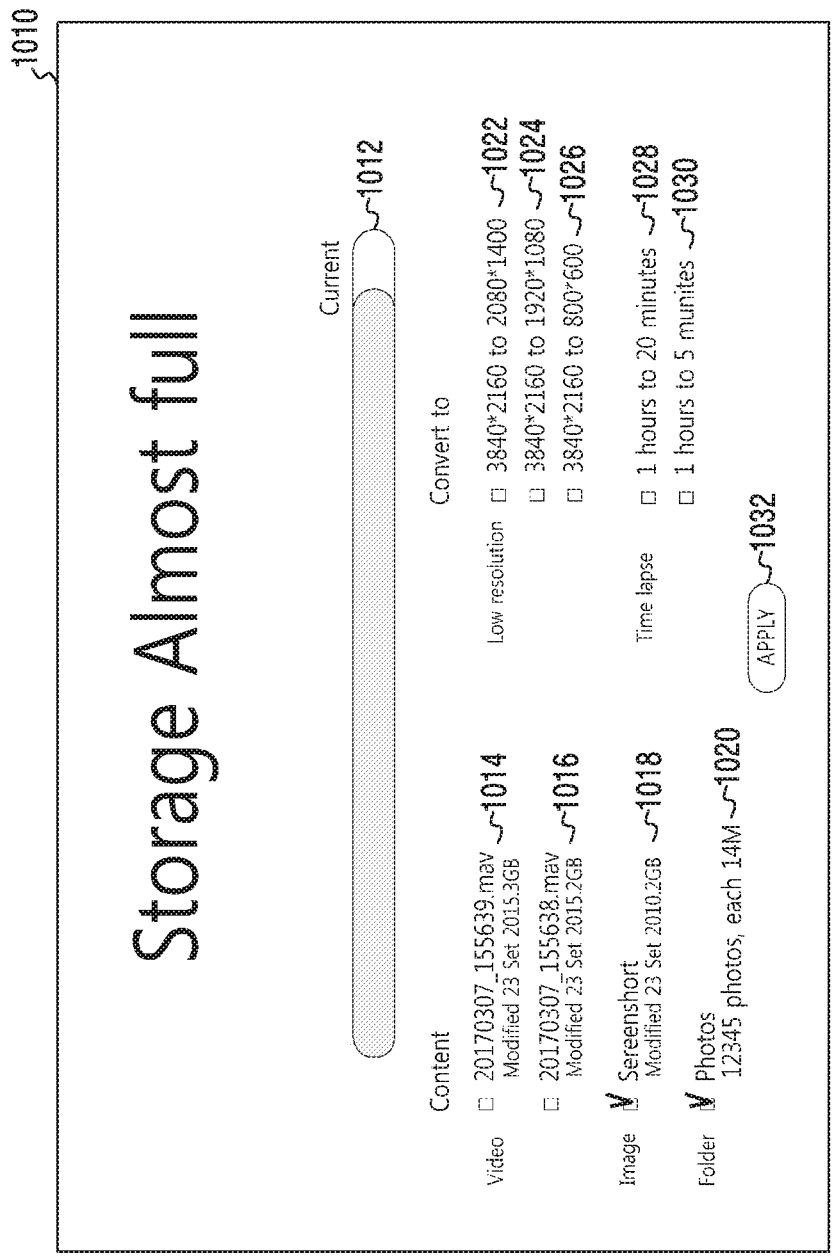
FIG. 10A illustrates a screen showing a file list of a high priority and a file converting scheme list according to various embodiments of the disclosure.
Figure 10B:
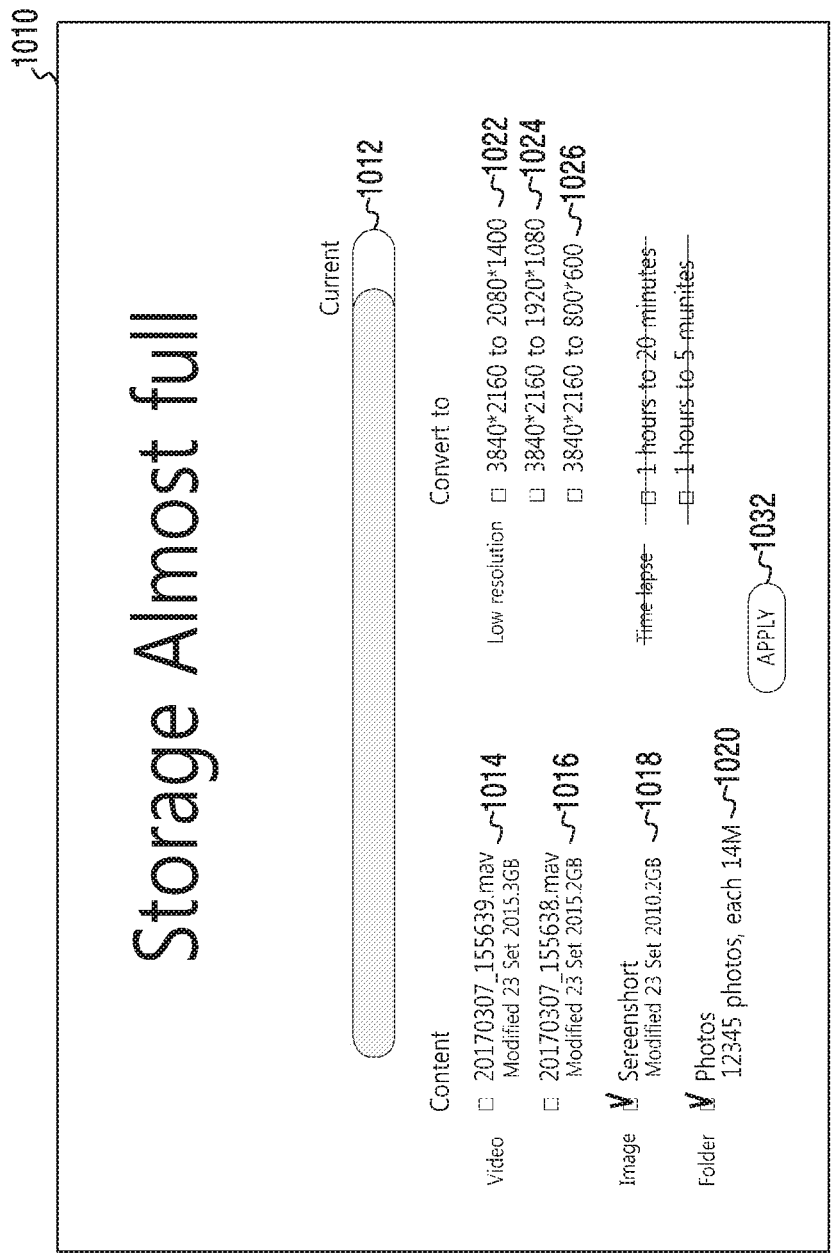
FIG. 10B illustrates a screen showing a refined file converting scheme list according to various embodiments of the disclosure.

FIG. 9 illustrates a flowchart for displaying a file list of high priority and a file converting scheme list in an electronic device according to various embodiments. FIGS. 10A and 10B illustrate an example for explaining operations illustrated in FIG. 9. FIG. 9 illustrates operations 430 and 440 of FIG. 4 in more detail.

Referring to FIGS. 9, 10A, and 10B, in operation 905, the processor 120 identifies whether a convertible file exists in the memory 130. The processor 120 may identify whether the convertible file exists in a scheme corresponding to an operation 705 of FIG. 7. Below, assume that the convertible file exists in plural in the memory 130.

In operation 910, the processor 120 identifies a priority of each of the convertible files. The processor 120 may identify the priority of each of the files in a scheme corresponding to an operation 710 of FIG. 7.

In operation 915, the processor 120 identifies files of high priorities. In an embodiment, the number of the identified files may be identified arbitrarily. In another embodiment, the number of the identified files may be identified based on a user input.

In operation 920, the processor 120 controls the display 160 to display a file list including the files of the high priorities, and a file converting scheme list corresponding to a key file (or a representative file). The key file may refer one file whose priority is highest among the convertible plurality of files. For example, referring to FIG. 10A, a screen 1010 may include a graph 1012 showing a current storage space state, video file names 1014 and 1016, and an image file name 1018. Also, the screen 1010 may include a folder name (e.g., an image folder name 1020) of a specified folder (e.g., a photo folder) among file folders stored in the memory 130. In response to assumption that a priority of a file corresponding to the video file name 1014 is highest (that is, in response to the file corresponding to the video file name 1014 being identified as a key file), the screen 1010 may include file converting schemes 1022, 1024, 1026, 1028, and 1030 corresponding to the key file. Though not illustrated in FIG. 10A, if a priority of a file corresponding to the image file name 1016 being highest, the file converting schemes 1028 and 1030 may not be included in the screen 1010, because an image file may not employ a time lapse effect applying scheme. A specified text displayed on the screen 1010 or objects such as an icon, a button, etc. are merely examples, and embodiments of the disclosure are not limited to the corresponding text or objects.

In operation 925, the processor 120 obtains whether an input for file selection is received. In response to the input for the file selection not being received, the processor 120 repeatedly performs operations 920 and 925. In response to the input for the file selection being received, the processor 120 may perform an operation 930.

In operation 930, the processor 120 identifies whether the selected file is a key file. In response to the selected file being the key file, the processor 120 may perform an operation 940. In response to the selected file not being the key file, in operation 935, the processor 120 refines the displayed file converting scheme list, wherein the displayed file converting scheme list corresponds to the selected file. For example, referring to FIG. 10B, in response to the image file name 1018 and the image folder name 1020 being selected, because an image file may not employ the time lapse effect applying scheme, the processor 120 may refine the file converting scheme list, wherein the file converting schemes 1028 and 1030 are not included in the screen 1010.

In operation 940, the processor 120 obtains whether an input for selecting the file converting scheme is received. In response to the input for selecting the file converting scheme not being received, the processor 120 repeatedly performs operations 920, 925, 930, 935, and 940. In response to the input for selecting the file converting scheme being received, the processor 120 performs an operation 945.

In operation 945, the processor 120 controls the display 160 to display a file converting result expected value corresponding to the selected file and selected file converting scheme. The processor 120 may control the display 160 to display the file converting result expected value in a scheme corresponding to an operation 745 of FIG. 7. Even though not explicitly illustrated in FIGS. 8 to 9, the processor 120 may control, as illustrated in FIG. 8D, the display 160 to display file converting result expected values for which file converting schemes not selected are applied.

Figure 11:
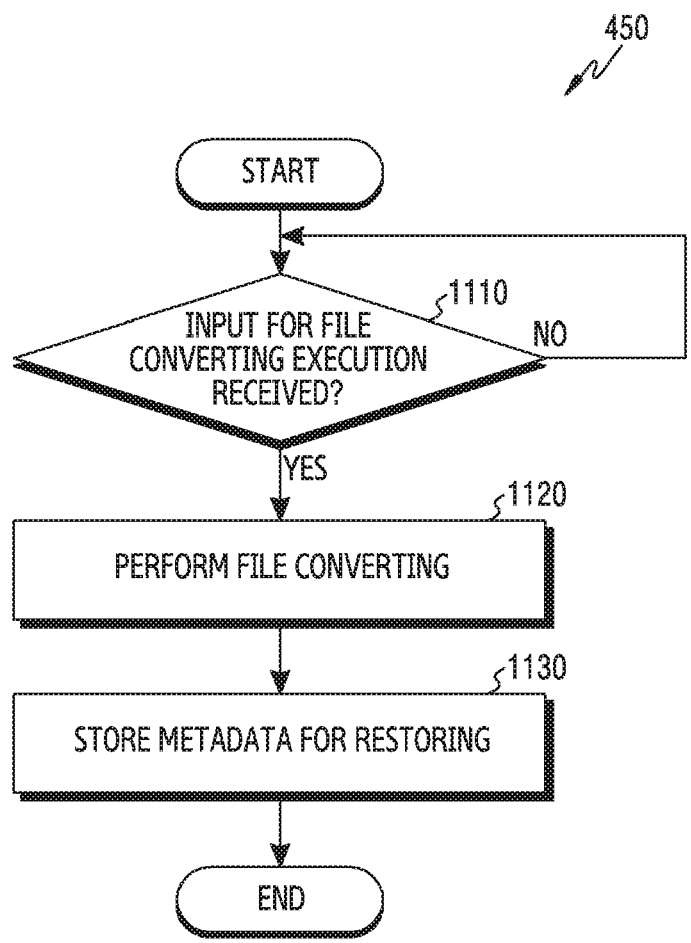
FIG. 11 illustrates a flowchart for performing file converting in an electronic device according to various embodiments of the disclosure.

FIG. 11 illustrates a flowchart for performing file converting in an electronic device according to various embodiments. FIG. 11 illustrates an embodiment of receiving an input for file converting execution in operation 450 of FIG. 4.

Referring to FIG. 11, in operation 1110, the processor 120 identifies whether an input for file converting execution is received. For example, the processor 120 obtains whether the input is received to an object 832 illustrated in FIG. 8D or an object 1032 illustrated in FIGS. 10A to 10B. In response to the input not being received, the processor 120 repeatedly performs operation 1110. In response to the input being received, the processor 120 may perform an operation 1120.

In operation 1120, the processor 120 performs file converting, based on a selected file and a selected file converting scheme. In an embodiment, the processor 120 may simultaneously perform file converting for each of the selected plurality of files. For example, in response to a plurality of image files being selected and a resolution converting scheme (e.g., converting from 3840*2160 to 2080*1040) being selected, the processor 120 may convert a resolution of each of a selected plurality of images in the same resolution converting scheme. In another embodiment, the processor 120 may apply two or more file converting schemes to one file. For example, in response to one video file being selected and a resolution converting scheme (converting from 3840*2160 to 2080*1040) and a running time reducing scheme (e.g., reducing from 30 minutes to 10 minutes) being selected, the processor 120 may change a resolution of the selected video file and a running time thereof.

In operation 1130, the processor 120 stores metadata for restoring of the converted file, in the memory 130. For example, in response to the resolution of the selected image file being converted from 3840*2160 to 2080*1040, the processor 120 may store, as metadata, information about an identifier of the converted image file and the original resolution (3840*2160). Though not illustrated in FIG. 11, the processor 120 may restore the resolution of the converted mage file to a previous resolution, based on the stored metadata. For example, the processor 120 may restore the resolution of the converted image file to the previous resolution by using an interpolation.

Figure 12:
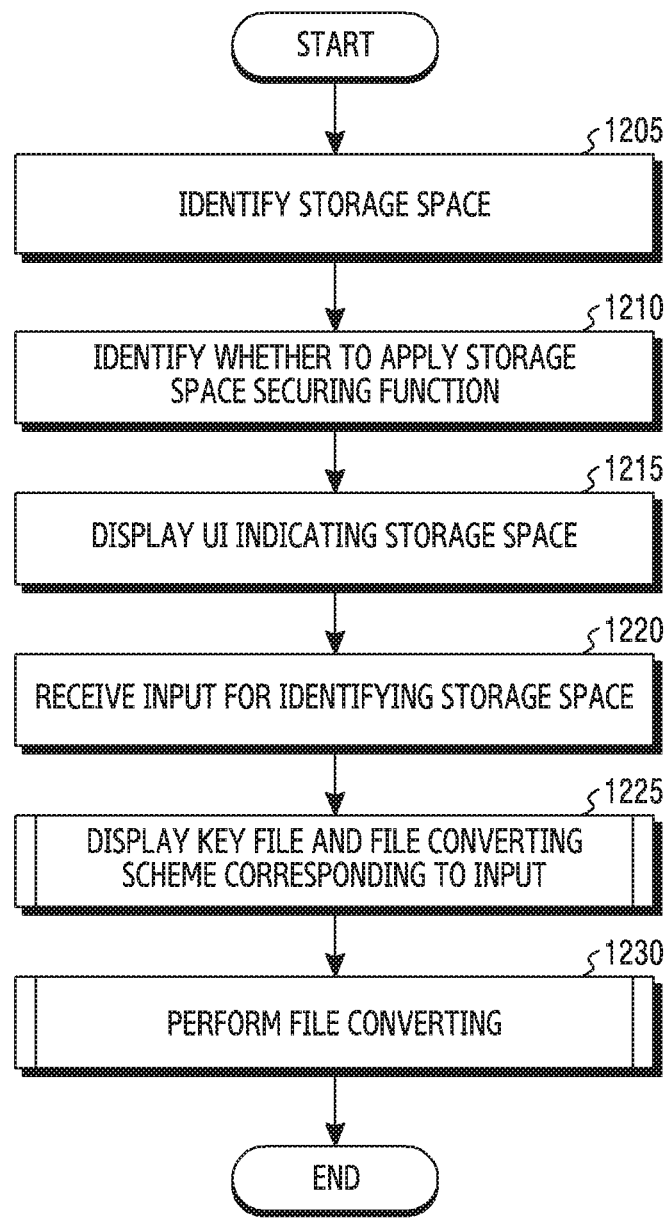
FIG. 12 illustrates a flowchart for performing file converting, based on an input of identifying a storage space in an electronic device according to various embodiments of the disclosure.

FIG. 12 illustrates a flowchart for performing file converting, based on an input of identifying a storage space in an electronic device according to various embodiments. FIGS. 13A, 13B, 13C, and 13D illustrate an example for explaining operations illustrated in FIG. 12.

Referring to FIGS. 12, 13A, 13B, 13C, and 13D, in operation 1205, the processor 120 identifies a remaining storage space of the memory 130. The processor 120 may identify a storage space every predefined period, or identify the storage space whenever a specified event takes place (e.g., in response to a user input being received or the electronic device 101 being connected to a cloud sever).

In operation 1210, the processor 120 identifies whether to apply a storage space securing function. In response to the storage space being insufficient or in response to a user input being received even though the storage space is not insufficient, the processor 120 may identify to apply the storage space securing function.

Figure 13A:
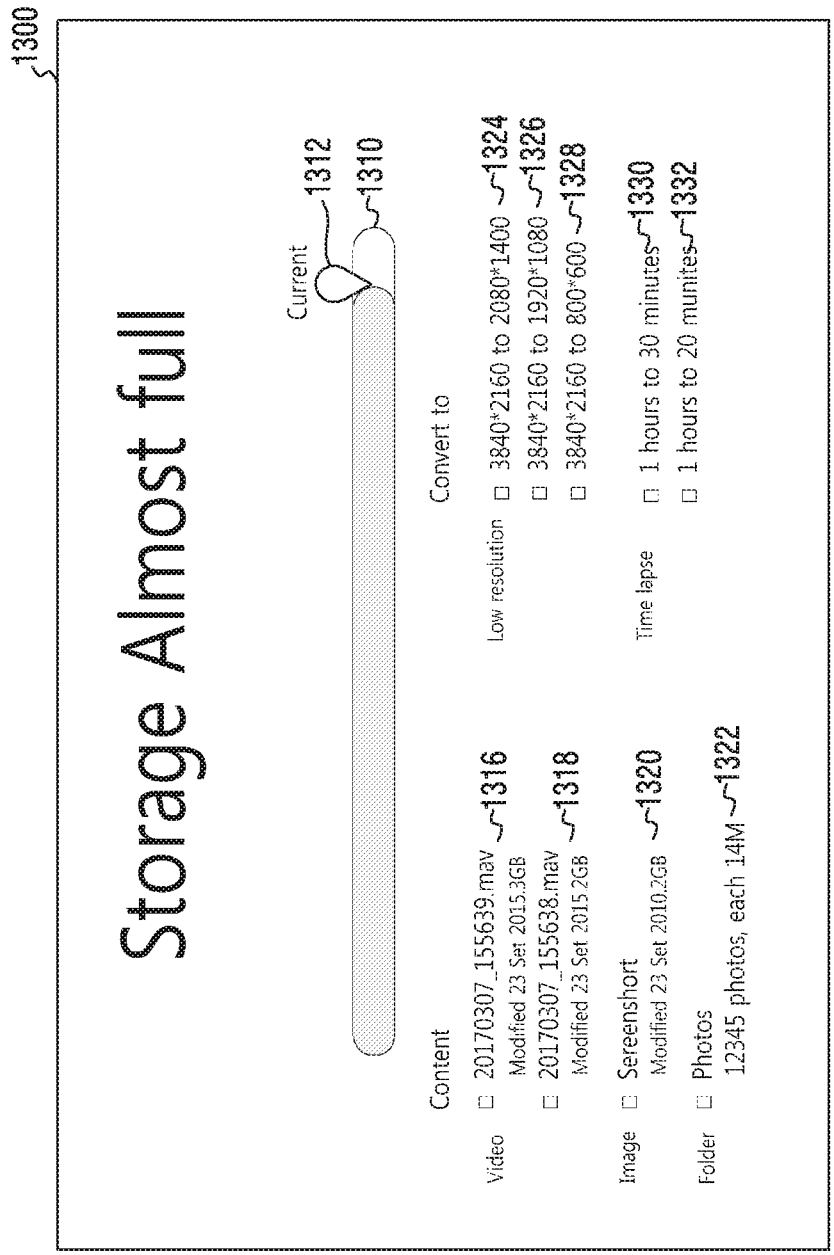
FIG. 13A illustrates a screen showing a storage space state according to various embodiments of the disclosure.

In operation 1215, the processor 120 controls the display 160 to display a user interface (UI) indicating a current storage space. In an embodiment, as illustrated in FIG. 13A, a screen 1300 may include a graph 1310 showing the whole storage space of the memory 130, an indicator 1312 indicating a current remaining storage space, a plurality of file names 1316, 1318, and 1320, a folder name 1322, and a plurality of file converting schemes 1324, 1326, 1328, 1330, and 1332. In an embodiment, the plurality of file names 1316, 1318, and 1320 and the folder name 1322 may be displayed in random order, or be displayed in a scheme corresponding to operations 710 and 715 of FIG. 7. In an embodiment, the plurality of file converting schemes 1324, 1326, 1328, 1330, and 1332 may be displayed in random order, or be displayed in a scheme corresponding to an operation 735 of FIG. 7. For example, the processor 120 may identify that a priority of a video file having the biggest file size is highest. In this case, the processor 120 may control the display 160 to display, at a top of a file list, the file name 1316, which is a video file name, corresponding to the file whose priority is highest. Also, the processor 120 may control the display 160 to display the plurality of file converting schemes 1324, 1326, 1328, 1330, and 1332 capable of being applied to the file corresponding to file name 1316, which is a video file name. Although not illustrated in FIG. 12, in response to a hovering input being obtained from the displayed plurality of file names 1316, 1318, and 1320, the processor 120 may control the display 160 to display a thumbnail of a file corresponding to the obtained hovering input. A specified text displayed on the screen 1300 or objects such as an icon, a button, etc. are merely examples, and embodiments of the disclosure are not limited to the corresponding text or objects.

Figure 13B:
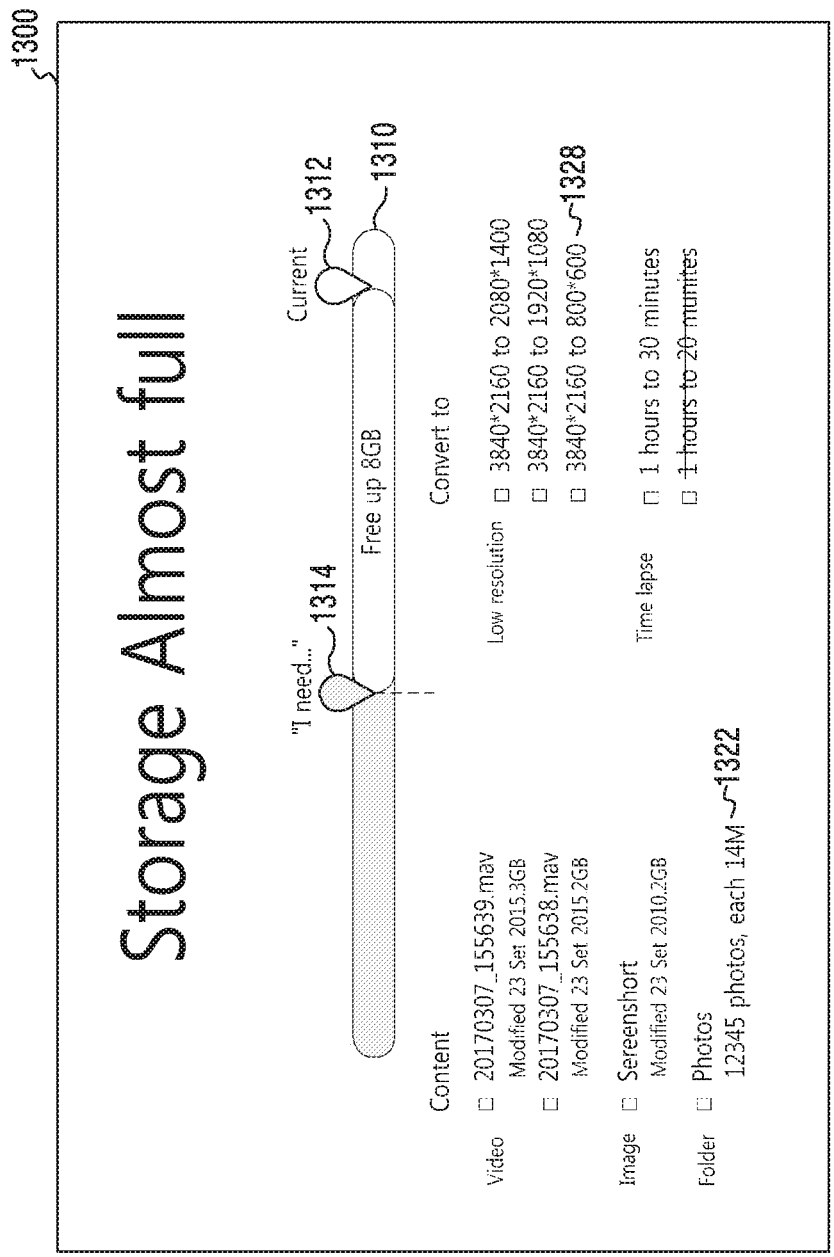
FIG. 13B illustrates a screen for explaining an operation of receiving an input of identifying a storage space according to various embodiments of the disclosure.

In operation 1220, the processor 120 receives an input of identifying the storage space. The input of identifying the storage space may be received in various schemes. In an embodiment, the processor 120 may receive a touch input or drag input that is obtained on the display 160. In another embodiment, the processor 120 may receive a mouse input or keyboard input. For example, as illustrated in FIG. 13B, the processor 120 may receive an input of changing the indicator 1312 included in the screen 1300 into a position of an indicator 1314. In other words, the processor 120 may recognize that a user desires to secure the storage space of the memory 130 by a difference (e.g., 8 GB) between the indicator 1312 and the indicator 1314.

Figure 13C:
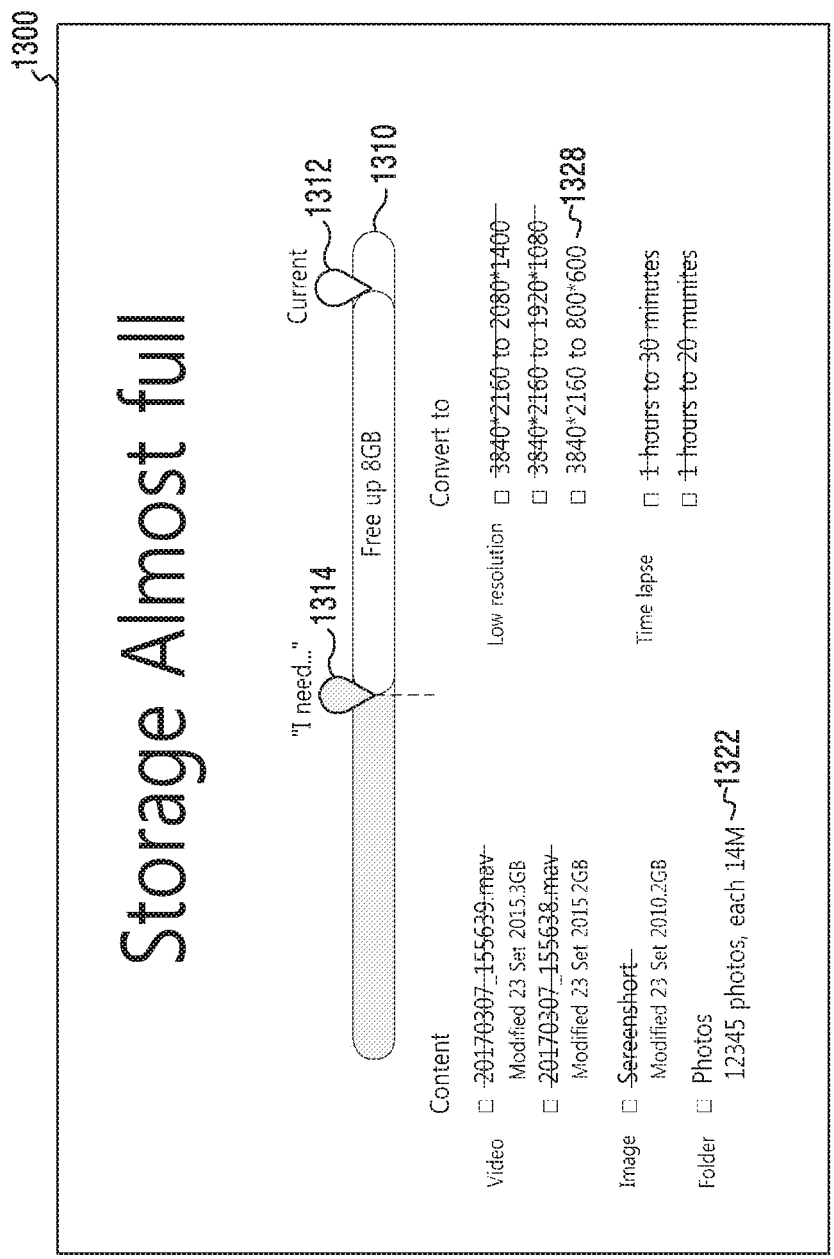
FIG. 13C illustrates an example of a screen displaying a file list and a file converting scheme list, based on a received input according to various embodiments of the disclosure.
Figure 13D:
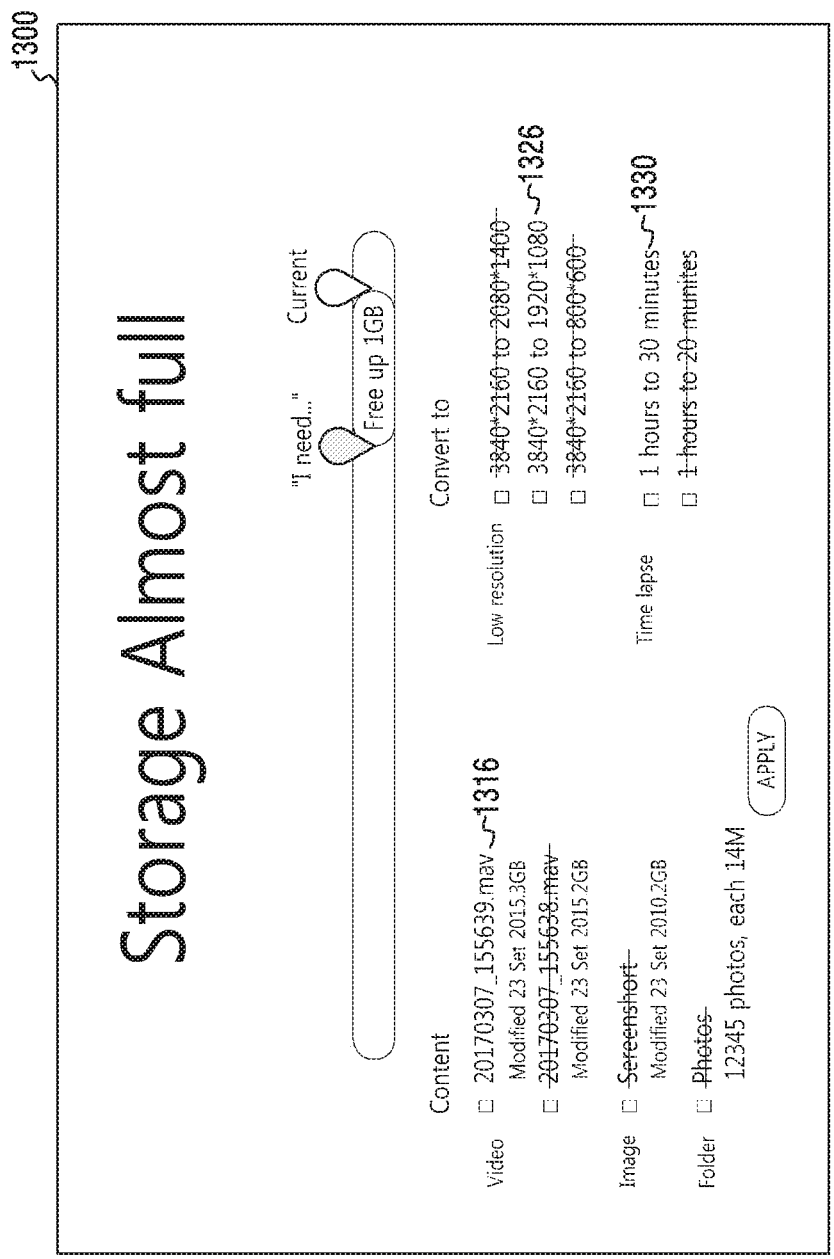
FIG. 13D illustrates another example of a screen displaying a file list and a file converting scheme list, based on a received input according to various embodiments of the disclosure.

In operation 1225, the processor 120 controls the display 160 to display a key file and a file converting scheme, which correspond to the received input, and, in operation 1230, the processor performs file converting. An operation of identifying the key file and file converting scheme which correspond to the received input is described in FIGS. 14 to 15. In an embodiment, as illustrated in FIG. 13B, assume that an input of identifying a storage space of 8 GB is received. To secure the storage space of 8 GB, the processor 120 may identify to apply a resolution converting scheme (converting from 3840*2160 to 800*600) to images included in a specified image folder. In this case, as illustrated in FIG. 13C, the processor 120 may control the display 160 to display the folder name 1322 of the image folder and the file converting scheme 1328. In another embodiment, as illustrated in FIG. 13D, assume that an input of identifying a storage space of 1 GB is received. To secure the storage space of 1 GB, the processor 120 may identify to apply a resolution converting scheme (converting from 3840*2160 to 1920*1080) to a specified video file or apply a time lapse effect (converting from 1 hour to 30 minutes) to the specified video file. In this case, the processor 120 may control the display 160 to display the folder name 1322 of the video file and the file converting schemes 1326 and 1330.

Figure 14:
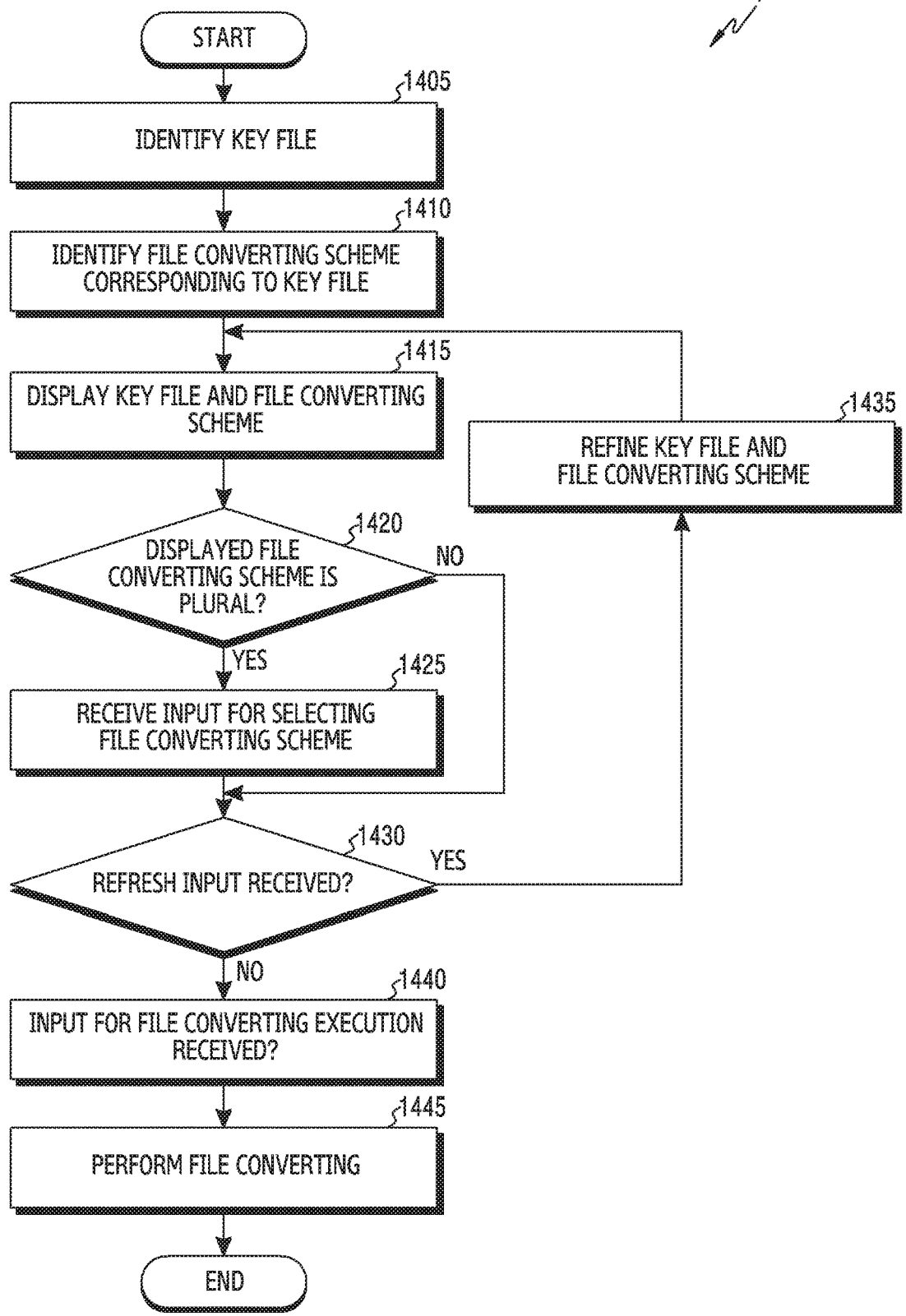
FIG. 14 illustrates a flowchart for displaying a key file and a file converting scheme, based on an input of identifying a storage space in an electronic device according to various embodiments of the disclosure.
Figure 15A:
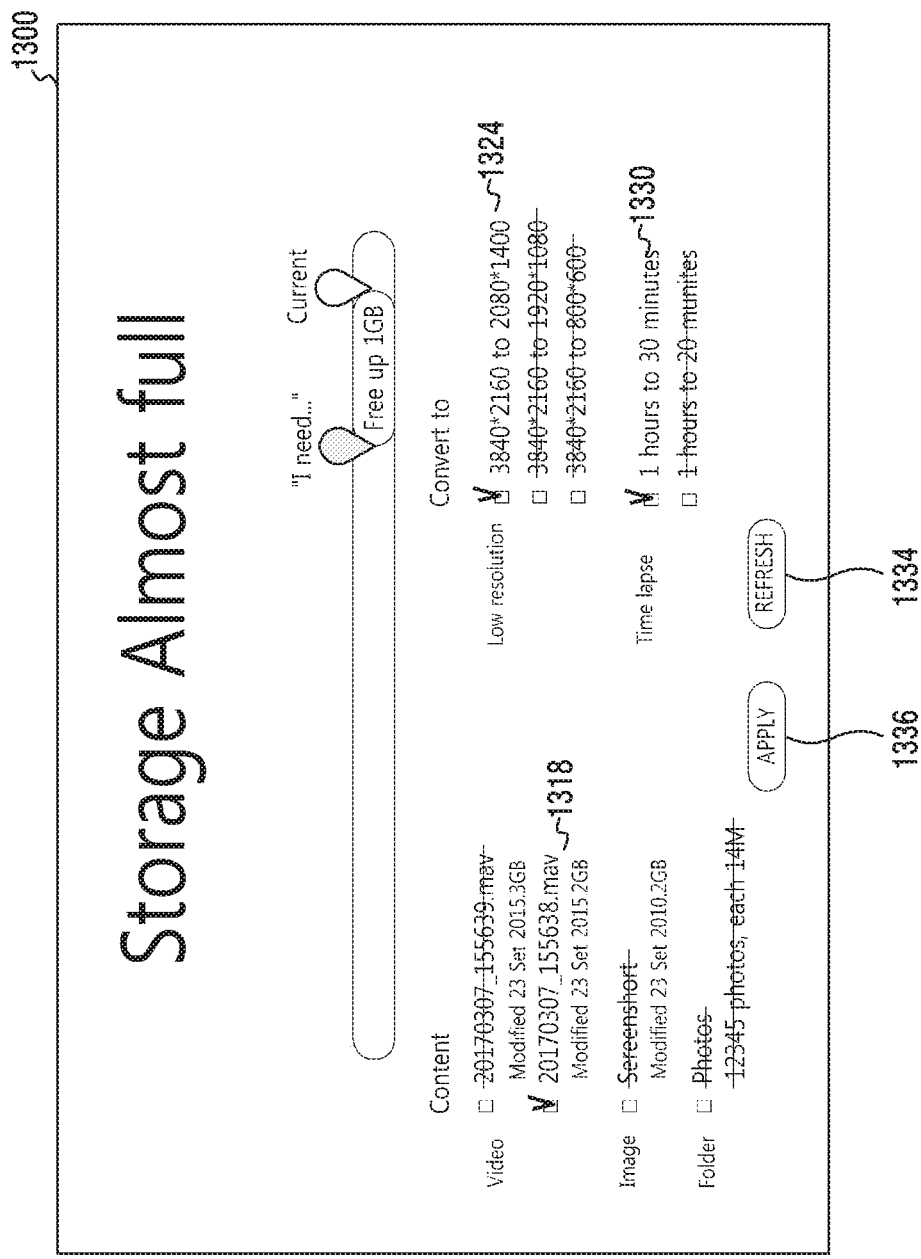
FIG. 15A illustrates a screen of displaying a key file and a file converting scheme, based on an input of identifying a storage space in an electronic device according to various embodiments of the disclosure.
Figure 15B:
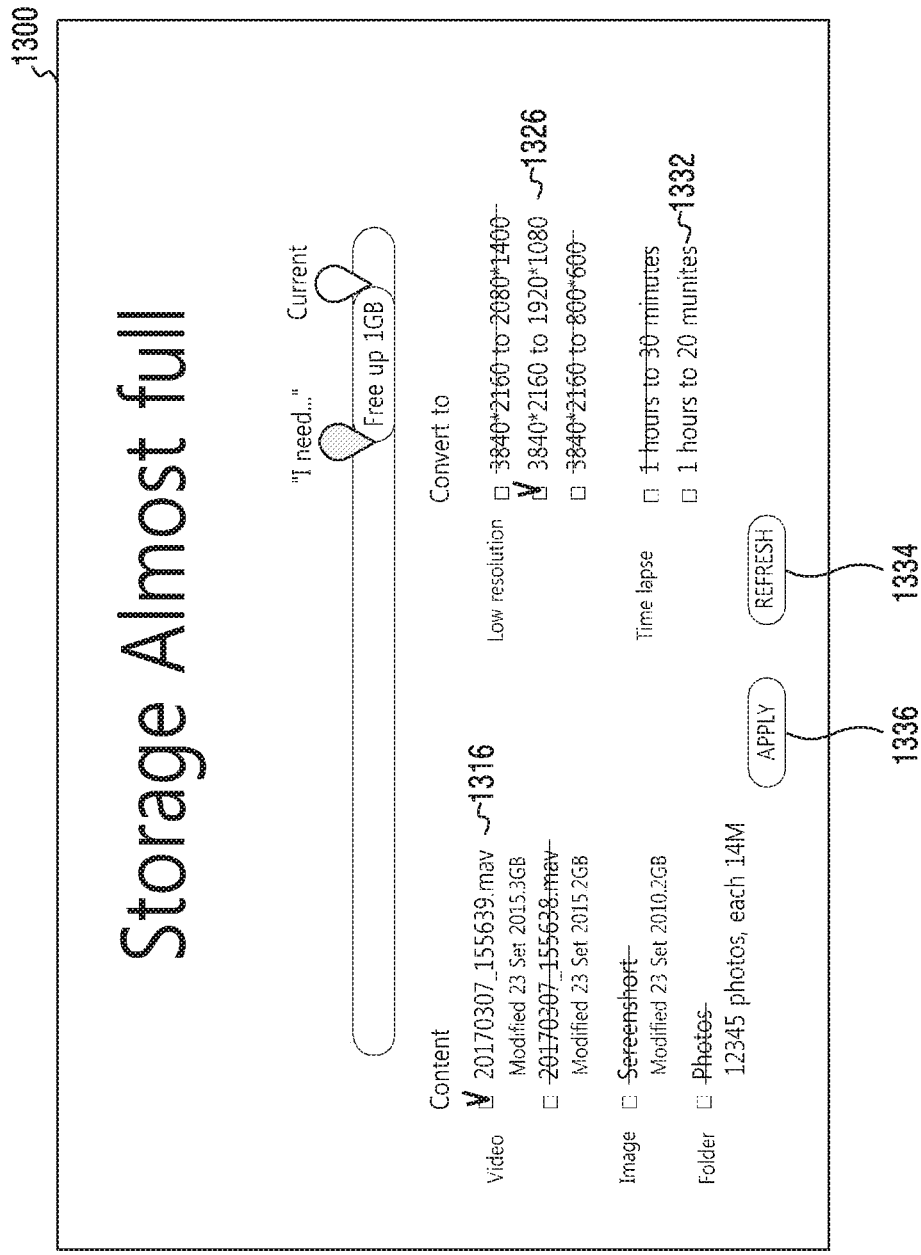
FIG. 15B illustrates a screen of displaying a refined key file and file converting scheme according to various embodiments of the disclosure.

FIG. 14 illustrates a flowchart for displaying a key file and a file converting scheme, based on an input of identifying a storage space in an electronic device according to various embodiments. FIGS. 15A and 15B illustrate an example for explaining operations of FIG. 14. FIG. 14 illustrates more operations of 1225 and 1230 of FIG. 12.

Referring to FIGS. 14, 15A, and 15B, in operation 1405, the processor 120 identifies a key file, based on an input of identifying a storage space. The key file may refer one file or folder whose priority is highest. The processor 120 may identify the key file, based on priorities of various references. For example, the priority may be identified based on a file size of each of files, a storage date, a creation date, a running count, a file attribute or a combination thereof.

In operation 1410, the processor 120 identifies a file converting scheme, based on the identified key file and the input of identifying the storage space. For example, as illustrated in FIG. 15A, assume that an input of identifying a storage space of 1 GB is received. The processor 120 may identify a specified video file as a key file, based on priority. To secure the storage space of 1 GB, the processor 120 may identify that it may perform a resolution converting scheme (converting from 3840*2160 to 2080*1400) or a time lapse effect applying scheme (converting from 1 hour to 30 minutes).

In operation 1415, the processor 120 controls the display 160 to display the identified key file and the identified file converting scheme. For example, as illustrated in FIG. 15A, the processor 120 may control the display 160 to display file name 1318 of the identified video file, and file converting schemes 1324, 1326, 1328, 1330, and 1330.

In operation 1420, the processor 120 identifies whether the displayed file converting scheme is plural. In response to the displayed file converting scheme being one in number, the processor 120 may perform operation 1430. For example, as illustrated in FIG. 13B, the screen 1300 includes only the file converting scheme 1328 and therefore, the processor 120 may immediately perform operation 1430. For another example, as illustrated in FIG. 15A, the screen 1300 may include the file converting scheme 1324 and the file converting scheme 1330, so the processor 120 may, in operation 1425, receive an input for file converting scheme selection.

In operation 1430, the processor 120 obtains whether a refresh input is received. The refresh input is an input for a user to request a key file and a file converting scheme other than the key file and file converting scheme included in the screen 1300. For example, in response to an input of a refresh button 1334 included in the screen 1300 of FIG. 15A being received, in operation 1435, the processor 120 may refine the file name and file converting scheme included in the screen 1300. In this case, as illustrated in FIG. 15B, the processor 120 may control the display 160 to display the folder name 1322 and the file converting scheme 1326 and 1332. In response to the refresh input not being received, in operation 1440, the processor 120 may receive an input for file converting execution. For example, as illustrated in FIGS. 15A to 15B, the processor 120 may receive an input to a button 1336.

In operation 1445, in response to the input for file converting execution (e.g., the button 1336) being received, the processor 120 performs file converting, based on the key file and the file converting scheme corresponding to the key file.

As described above, according to various embodiments of the disclosure, an operation method of an electronic device for securing a storage space may include identifying a storage space of a memory of the electronic device, identifying whether to apply a storage space securing function for the memory, displaying a file converting scheme list including a plurality of file converting schemes, selecting one file converting scheme among the plurality of file converting schemes, based on a received input, and performing file converting, based on the selected file converting scheme. The file converting scheme may include a resolution converting scheme of a file stored in the memory, a running time reducing scheme, or a time lapse effect applying scheme.

In an embodiment, displaying the file converting scheme list may include obtaining at least one file whose file converting is available among a plurality of files stored in the memory, identifying a priority of the obtained at least one file, displaying at least one file whose priority is highest among the at least one file, receiving an input of selecting one file among the displayed at least one file, and displaying a file converting scheme list corresponding to the received input. In an embodiment, identifying the priority may include identifying the priority, based on at least one of a size of the obtained at least one file, a storage date, and/or a running count.

In an embodiment, the operation method of the electronic device may further include determining a file converting result expected value, based on the selected file and the selected file converting scheme, and displaying the file converting result expected value.

In an embodiment, the operation method of the electronic device may further include obtaining a hovering input on one file among the displayed at least one file, and displaying a thumbnail of the file corresponding to the obtained hovering input.

In an embodiment, the operation method of the electronic device may further include storing, in the memory, metadata about a file of which the file converting has been performed. The metadata may denote metadata for restoring the file of which the file converting has been performed.

An electronic device and an operation method thereof according to various embodiments of the disclosure suggest a variety of file converting schemes used to secure a storage space to a user, thereby being capable of securing a storage space corresponding to a user's intent in the electronic device.

An electronic device and an operation method thereof according to various embodiments of the disclosure recommend a variety of file converting schemes used to secure a storage space, based on a secured storage space desired by a user, thereby being capable of securing a storage space corresponding to a user's intent in the electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device for securing a storage space, the electronic device comprising:
   a display;
   a memory; and
   a processor operatively coupled to the display and the memory,
   wherein the processor is configured to:
      identify a residual level of a storage space of the memory based on at least one of a predefined period, receiving a user input, installing an application, and connecting the electronic device to a server,
      in response to the residual level of the storage space of the memory being less than a predefined threshold value, control the display to display a screen showing a storage space deficiency state, wherein the screen comprises an object receiving a first input for applying a storage space securing function,
      in response to receiving the first input for the object, obtain at least one file whose file converting is available among a plurality of files stored in the memory,
      identify a priority of the obtained at least one file,
      control the display to display at least one file whose priority is highest among the obtained at least one file,
      receive a second input selecting one file among the displayed at least one file,
      control the display to display a file converting scheme list comprising a plurality of file converting schemes corresponding to the selected file,
      receive a third input selecting two or more file converting schemes among the plurality of file converting schemes, and
      perform file converting for the selected file, based on the selected file converting schemes.

2. The electronic device of claim 1, wherein the file converting schemes comprise at least one of a resolution converting scheme of a file stored in the memory, a running time reducing scheme, or a time lapse effect applying scheme.

3. The electronic device of claim 1, wherein the processor is further configured to identify the priority, based on at least one of a size of the obtained at least one file, a storage date, and/or a running count.

4. The electronic device of claim 1, wherein the processor is further configured to:
   determine a file converting result expected value, based on the selected file and the selected file converting schemes, and
   control the display to display the file converting result expected value.

5. The electronic device of claim 1, wherein the processor is further configured to:
   obtain a hovering input on a file among the displayed at least one file, and
   control the display to display a thumbnail of the file corresponding to the hovering input.

6. The electronic device of claim 1,
   wherein the processor is further configured to store, in the memory, metadata about a file of which the file converting has been performed, and
   wherein the metadata corresponds to metadata for restoring the file of which the file converting has been performed.

7. An operation method of an electronic device for securing a storage space, the method comprising:
   identifying a residual level of a storage space of a memory of the electronic device based on at least one of a predefined period, receiving a user input, installing an application, and connecting the electronic device to a server;
   in response to the residual level of the storage space of the memory being less than a predefined threshold value, displaying a screen showing a storage space deficiency state, wherein the screen comprises an object receiving a first input for applying a storage space securing function;
   in response to receiving the first input for the object, displaying obtaining at least one file whose file converting is available among a plurality of files stored in the memory;
   identifying a priority of the obtained at least one file;
   displaying at least one file whose priority is highest among the obtained at least one file;
   receiving a second input selecting one file among the displayed at least one file;
   displaying a file converting scheme list comprising a plurality of file converting schemes corresponding to the selected file;
   receiving a third input selecting two or more file converting schemes among the plurality of file converting schemes; and
   performing file converting for the selected file, based on the selected file converting schemes.

8. The method of claim 7, wherein the file converting schemes comprise at least one of a resolution converting scheme of a file stored in the memory, a running time reducing scheme, or a time lapse effect applying scheme.

9. The method of claim 7, wherein the identifying of the priority comprises identifying the priority, based on at least one of a size of the obtained at least one file, a storage date, and/or a running count.

10. The method of claim 7, further comprising:
determining a file converting result expected value, based on the selected file and the selected file converting schemes; and
displaying the file converting result expected value.

11. The method of claim 7, further comprising:
obtaining a hovering input on a file among the displayed at least one file; and
displaying a thumbnail of the file corresponding to the hovering input.

12. The method of claim 7, further comprising:
storing, in the memory, metadata about a file of which the file converting has been performed,
wherein the metadata corresponds to metadata for restoring the file of which the file converting has been performed.

* * * * *